United States Patent
Newman et al.

(10) Patent No.: US 12,035,232 B2
(45) Date of Patent: *Jul. 9, 2024

(54) DISCOVERY AND INITIAL ACCESS FOR REDUCED-CAPABILITY DEVICES IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/124,136

(22) Filed: Mar. 21, 2023

(65) Prior Publication Data

US 2023/0239782 A1    Jul. 27, 2023

Related U.S. Application Data

(63) Continuation of application No. 17/895,137, filed on Aug. 25, 2022, now Pat. No. 11,627,524, which is a continuation of application No. 17/585,992, filed on Jan. 27, 2022, now Pat. No. 11,452,035.

(60) Provisional application No. 63/256,042, filed on Oct. 15, 2021, provisional application No. 63/220,669, filed on Jul. 12, 2021, provisional application No. 63/214,489, filed on Jun. 24, 2021, provisional application No. 63/210,216, filed on Jun. 14, 2021.

(51) Int. Cl.
*H04W 48/20* (2009.01)
*H04W 4/12* (2009.01)
*H04W 56/00* (2009.01)
*H04W 74/0816* (2024.01)

(52) U.S. Cl.
CPC .......... *H04W 48/20* (2013.01); *H04W 4/12* (2013.01); *H04W 56/001* (2013.01); *H04W 74/0816* (2013.01)

(58) Field of Classification Search
CPC .......... H04W 4/42; H04W 4/14; H04W 4/70; H04W 8/05; H04W 64/04; H04W 67/12; H04W 72/1268; H04W 72/04; H04W 72/0446; H04W 84/18
See application file for complete search history.

(56) References Cited

U.S. PATENT DOCUMENTS 6,751,200 B1    6/2004 Larsson et al.
7,272,635 B1 *  9/2007 Longtin .............. H04L 41/0663
                                                   709/227

(Continued)

*Primary Examiner* — Jean A Gelin

(57) ABSTRACT

A user device, such as a vehicle, may find a suitable base station for communication according to a hailing message. A low-complexity hailing procedure, suitable for adding to 5G and 6G standards, is presented. The hailing message may be a brief code indicating that it is a hailing message, and therefore solicits a reply. The hailing message may further include the identification or location of the user device, and/or an indication of which type of entity is being sought, such as a base station. The base stations that receive the hailing message can reply after a calculated delay time, such as a longer delay time if the received amplitude is weak, so that the user device can select whichever base station has the best received signal. Alternatively, the user device can select the base station with the largest received amplitude of the reply message.

20 Claims, 7 Drawing Sheets

(56) References Cited

U.S. PATENT DOCUMENTS

| | | | |
|---|---|---|---|
| 7,334,126 B1* | 2/2008 | Gilmore | H04L 63/0281 713/168 |
| 8,971,231 B2 | 3/2015 | Hua | |
| 9,369,939 B2* | 6/2016 | Zhou | H04W 76/14 |
| 10,575,337 B2* | 2/2020 | Martin | H04W 28/0205 |
| 10,820,182 B1 | 10/2020 | Newman et al. | |
| 2004/0153491 A1 | 8/2004 | Harada | |
| 2006/0293061 A1 | 12/2006 | Kobayashi | |
| 2007/0060043 A1 | 3/2007 | Qi | |
| 2007/0133756 A1* | 6/2007 | Graves, III | H04L 12/1859 379/37 |
| 2008/0059050 A1 | 3/2008 | Lin | |
| 2010/0177681 A1 | 7/2010 | Sahinoglu | |
| 2010/0317284 A1 | 12/2010 | Charbit | |
| 2012/0134287 A1 | 5/2012 | Turunen | |
| 2012/0197988 A1 | 8/2012 | Leppanen | |
| 2012/0295654 A1* | 11/2012 | Sridhara | G01S 5/0273 455/517 |
| 2013/0107772 A1* | 5/2013 | Splitz | H04W 56/0015 370/350 |
| 2014/0185499 A1 | 7/2014 | Ray | |
| 2014/0310349 A1 | 10/2014 | Rainsto | |
| 2015/0150064 A1 | 5/2015 | Ha | |
| 2015/0327048 A1 | 11/2015 | Lee | |
| 2016/0165533 A1 | 6/2016 | Yang | |
| 2018/0035408 A1 | 2/2018 | Zhang | |
| 2018/0212792 A1* | 7/2018 | Brandt | H04W 52/0219 |
| 2018/0242223 A1 | 8/2018 | Chendamarai Kannan | |
| 2019/0028877 A1 | 1/2019 | Loehr | |
| 2019/0037022 A1 | 1/2019 | Gupta | |
| 2019/0182633 A1 | 6/2019 | Wang | |
| 2019/0313221 A1 | 10/2019 | Lee | |
| 2019/0357126 A1 | 11/2019 | Marinier | |
| 2020/0044810 A1 | 2/2020 | Yang | |
| 2020/0100093 A1 | 3/2020 | Ren | |
| 2020/0164799 A1 | 5/2020 | Nowakowski | |

* cited by examiner

DISCOVERY AND INITIAL ACCESS FOR REDUCED-CAPABILITY DEVICES IN 5G/6G

PRIORITY CLAIMS AND RELATED APPLICATIONS

This application is a continuation of U.S. patent application Ser. No. 17/895,137, entitled "Rapid Discovery of Closest Base Station in 5G and 6G Networks", filed Aug. 25, 2022, which is a continuation of U.S. patent application Ser. No. 17/585,992, entitled "Hailing Procedure for V2R, V2V, and V2X Initial Contact in 5G and 6G", filed Jan. 27, 2022, which claims the benefit of U.S. Provisional Patent Application Ser. No. 63/210,216, entitled "Low-Complexity Access and Machine-Type Communication in 5G", filed Jun. 14, 2021, and U.S. Provisional Patent Application Ser. No. 63/214,489, entitled "Low-Complexity Access and Machine-Type Communication in 5G", filed Jun. 24, 2021, and U.S. Provisional Patent Application Ser. No. 63/220,669, entitled "Low-Complexity Access and Machine-Type Communication in 5G", filed Jul. 12, 2021, and U.S. Provisional Patent Application Ser. No. 63/256,042, entitled "Hailing Procedure for V2R, V2V and V2X Initial Contact in 5G", filed Oct. 15, 2021, all of which are hereby incorporated by reference in their entireties.

FIELD OF THE INVENTION

The disclosure involves ways to locate and connect to a 5G or 6G wireless network.

BACKGROUND OF THE INVENTION

Before communicating on a 5G or 6G cell or network, a new user is required to perform a multi-step "discovery" process of finding and initially contacting a base station of the network, then registering, and eventually being authenticated on the network, a process that involves complex computations, significant delays, and many uncertainties. When a user device finally locates and attempts to make initial contact with a base station, that network may not be open to new entrants, or may not provide accommodations or performance or other services that the user device requires. Similar problems inhibit communications between vehicles as well as other mobile and fixed devices. What is needed is a way for user devices, especially mobile user devices, to find and initially contact a local base station and other wireless entities, with less complexity, uncertainty, and delay.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device to select a base station, the method comprising: determining a hailing frequency allocated for user devices to transmit hailing messages; transmitting, on the hailing frequency, a hailing message comprising a request for a base station to transmit a reply message on the hailing frequency; receive, during a predetermined interval, one or more reply messages, each reply message transmitted, at a calculated time, by a replying base station, responsive to the hailing message; for each reply message, determining a time delay between transmitting the hailing message and receiving the reply message; selecting, as a selected base station, one of the base stations according to the time delay; and transmitting an entry request message to the selected base station.

In another aspect, there is non-transitory computer-readable media in a base station of a wireless network, the media containing instructions that when implemented in a computing environment cause a method to be performed, the method comprising: determining a hailing frequency allocated for user devices to transmit hailing messages; receiving, on the hailing frequency, a hailing message from a user device; measuring an amplitude of the hailing message as received by the base station; calculating, according to a formula based on the amplitude, a delay time; while monitoring the hailing frequency, waiting the delay time; upon expiration of the delay time, determining whether another base station is transmitting on the hailing frequency; and upon determining that no other base station is transmitting on the hailing frequency, transmitting a reply message to the user device.

In another aspect, there is a processor comprising an AI (artificial intelligence) model, the processor configured to: take, as input: a list of base stations receiving a hailing message from a user device; a current occupancy of each base station in the list; a maximum capacity of each base station in the list; and an amplitude of the hailing message as received by each base station in the list; and provide, as output, a selected base station that is to transmit a reply message to the user device.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

Figure 1A:
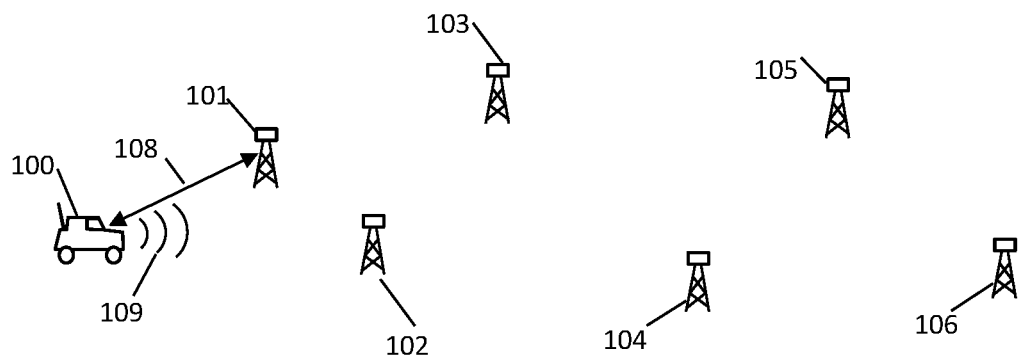
FIG. 1A is a sketch showing an exemplary embodiment of a hailing message broadcast to multiple base stations, according to some embodiments.

DETAILED DESCRIPTION 5G and 6G technologies are intended for eMBB (enhanced Mobile Broadband communications), URLLC (ultra reliable low latency communications), and mMTC (massive machine-type communication) generally involving large numbers of user devices such as vehicles, mobile phones, self-propelled and robotic machines, portable and stationary computers, and many other advanced wireless instruments. A new user that wishes to transmit a data message in 5G or 6G is required to perform a complex series of steps starting with a "blind search" through a potentially large number of frequencies until finding ("discovering") a system information message from one of the base stations in range, and then following a multi-step procedure of message exchanges and delays before being able to transmit the data message. A mobile device seeking communication with another device, such as a vehicle in traffic or a roadside wireless device, must perform a similar time-consuming and uncertain search.

The overall goal of 5G/6G is to maximize performance, as measured by high volume capacity, high speed data flow, low latency, and highly reliable communications among wireless devices that are assumed to be highly competent. However, many planned wireless IoT (internet of things) applications involve low-cost, single-purpose devices with reduced capabilities (RedCap) which may have difficulty completing this arduous initialization process. Many if not most of the future MTC (machine-type communication) devices are expected to be low-cost, narrow-bandwidth, reduced-capability devices designed for a single purpose, such as sensors and actuators. Such devices generally do not require high performance communications, have low QoS (quality of service) needs, and may have difficulty complying with the complex requirements of 5G and 6G. An efficient way to accommodate both high-performance users and reduced-capability devices may be to provide low-complexity alternatives and options in a manner that avoids burdening base stations and avoids interfering with higher-priority users. That is the intent of the procedures presented below.

Disclosed herein are low-complexity procedures enabling user devices to find 5G/6G base stations and other wireless entities, make initial contact with them, and continue communicating wirelessly. Systems and methods disclosed herein (the "systems" and "methods", also occasionally termed "embodiments" or "arrangements", generally according to present principles) can provide urgently needed wireless communication protocols to reduce access complexity and delays, by providing low-complexity options to accommodate reduced-capability user devices in networks such as 5G and 6G networks, according to some embodiments. The disclosed systems and methods are generally intended to facilitate "initialization" which includes a prospective user device finding a suitable base station, acquiring system information about the base station's network, making initial contact with the base station, receiving and processing a first response message from the base station, and completing the registration process on that network. Initialization also includes user devices seeking wireless entities other than base stations, such as vehicles in traffic, other mobile devices, fixed wireless assets, and the like. Embodiments of the systems and methods may include a "hailing" message, which is a message broadcast by a user device to make initial contact with one or more proximate entities, and responsive messaging by those base stations or entities. Embodiments may include procedures for V2N (vehicle-to-network) initialization, V2V (vehicle-to-vehicle) initialization, and V2X (vehicle-to-everything) initialization. The user device may broadcast a hailing message to prompt responsive messages from other transmitters within range. The hailing message may indicate whether the user device seeks communication with a base station, a vehicle, or any wireless entity. Additional embodiments may include a low-complexity channel or allocated frequency, on which reduced-capability user devices may communicate. Other embodiments may include message formats such as low-complexity hailing message formats and their response messages. The prospective user device, by broadcasting such a hailing message and receiving one or more response messages from proximate wireless entities, may thereby initiate communication with a selected one of the entities by transmitting an introductory message to the selected entity, while avoiding many uncertain and time-consuming 5G/6G procedures.

Some embodiments of the systems and methods may include low-complexity procedures. Such low-complexity procedures may be configured to avoid high-speed signal processing and other challenging computational steps, specifically those employed in standard 5G/6G communications such as "scrambling" in which a message or an error-check code is mixed with an identity code of the intended recipient, requiring all user devices to analyze all downlink control signals to determine whether a message addressed to them is present. Unfortunately, scrambling prevents the intended recipient from recognizing and mitigating interference and message faults, because faulted messages to the user device do not appear to be addressed to the user device, as a consequence of the scrambling. Further challenging process steps may include "DFT precoding" (discrete Fourier transform), "rate-matching", "bit interleaving", "segmenting", "turbo encoding", "column permutation", and other operations that may not be needed for low-complexity IoT tasks, and may excessively burden reduced-capability user devices. Low latency and ultra-reliable messaging may provide little or no advantage to low-cost, low-performance devices that transmit and receive only brief and infrequent messages, as is typical of MTC applications. Instead, in examples below, a message may be modulated directly from the plain-text message bits, transmitted sequentially on a particular frequency, demodulated by the receiver, and interpreted by the receiving entity without further processing. Application developers will demand ways to access networks using bandwidths and protocols appropriate to the simpler devices. It is important to provide such low-complexity options early in the 6G roll-out, while such flexibility can still be incorporated in the system design.

Terms herein generally follow 3GPP (third generation partnership project) standards, but with clarification where needed to resolve ambiguities. As used herein, "5G" represents fifth-generation, and "6G" sixth generation, wireless technology. "NB-IoT" (narrow-band Internet-of-things) and "5G-Light" are versions that provide slightly reduced complexity and bandwidth requirements. A network (or cell or LAN or local area network or the like) may include a base station (or gNB or generation-node-B or eNB or evolution-node-B or access point) in signal communication with a plurality of user devices (or UE or user equipment or user nodes or terminals) and operationally connected to a core network (CN) which handles non-radio tasks such as administration, and is usually connected to a larger network such as the Internet. The time-frequency space is generally configured as a "resource grid" including a number of "resource elements", each resource element being a specific unit of time termed a "symbol period" (or OFDM symbol, orthogonal frequency-division multiplexing) and a specific frequency and bandwidth termed a "subcarrier" (or "subchannel" in some references). The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "channels" or "resource element groups" in references) including 12 subcarriers. Each subcarrier is at a slightly different frequency and can be independently modulated to convey message information. The "numerology" of a resource grid corresponds to the subcarrier spacing in the frequency domain. Subcarrier spacings of 15, 30, 60, 120, and 240 kHz are defined in various numerologies. Thus a resource element, spanning a single symbol period in time and a single subcarrier in frequency, is the smallest unit of a message. Communication in 5G/6G generally takes place on abstract message "channels" (not to be confused with frequency channels) representing different types of messages, embodied as a PDCCH and PUCCH (physical downlink and uplink control channels) for transmitting control information, PDSCH and PUSCH (physical downlink and uplink shared channels) for transmitting data and other non-control information, PBCH (physical broadcast channel) for transmitting information to multiple user devices, among other channels that may be in use. In addition, one or more random access channels, termed "RACH" herein, also called PRACH in references, represents both abstract and physical random access channels, including potentially multiple random access channels in a single cell, and configured for uplink and/or downlink, as detailed below. "CRC" (cyclic redundancy code) is an error-checking code. "RNTI" (radio network temporary identity) is a network-assigned user code. An "SSB" (system synchronization block) is a complex message, normally on the PBCH, providing system information to new users, including how to receive messages. A "SIB1" (system information block number 1) is another system information message, normally on the PDSCH, instructing new users on how to transmit messages to the base station. A "preamble" is a message transmitted by a prospective user device on a random access channel requesting entry into a cell. An "RAR" (random access response) is a message sent by a base station responsive to a preamble message, providing a new user with a temporary identification and other data.

In addition to the 3GPP terms, the following are used herein. To avoid confusion with the term "symbol", each modulated resource element of a message is referred to as a "modulated message resource element" or a "message element" in examples below. Each resource element of a demodulation reference is referred to as a "reference element". A message may be configured "time-spanning" by occupying sequential symbol periods at a single frequency, and "frequency-spanning" on multiple subcarriers or subchannels at a single symbol period. Those terms are often conflated with TDD (time-division duplexing) and FDD (frequency-division duplexing), which refer to message duplexing. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A message is "faulted" or "corrupted" if one or more bits of the message are altered relative to the original message. "Random" and "pseudorandom" may be used interchangeably. References often use the same term for two different things. For example, "RACH" may refer to a random access message or to the channel on which it is transmitted or to the initial log-in procedure, "PBCH" may refer to a system information message or to the time-frequency resources on which it appears. Disambiguation will be provided when necessary.

As used herein, "low-complexity" refers to procedures necessary for wireless communication, exclusive of procedures providing high-performance communication. 5G and especially 6G include many procedures and requirements greatly exceeding those necessary for wireless communication, but necessary for high volume at low latency and high reliability. Compared to scheduled and managed 5G/6G messaging, low-complexity procedures generally require less computation and less signal processing. For ease of reception, low-complexity messages are generally modulated directly from the initial message, without further encoding or other modifications, so that each received message element can be demodulated and interpreted according to the original message data without additional signal processing or other processing. Low-complexity procedures may be tailored, or defaults may be established, to minimize the number of separate operations required of a user device. Low-complexity procedures may provide means for a single-purpose wireless product to be developed around a simple low-cost transceiver and a simple processor such as a microcontroller or ASIC (application-specific integrated circuit). One intent of the low-complexity procedures may be that the processor may thereby dedicate its efforts primarily to serving its intended application, rather than carrying out complex 5G/6G requirements.

"Reduced-capability" refers to wireless devices that cannot comply with 5G or 6G protocols, absent the systems and methods disclosed herein. IA "low-complexity channel"

refers to a frequency or a band of frequencies allocated for user device communications meeting certain predetermined criteria. The criteria may include a limit on the size of messages, a limit on the number of messages or volume per day, or a limit on the transmitted power level. Communications on the low-complexity channel may be transmitted at-will or without grant, according to some embodiments. Transmissions may be narrow-band such as 100 kHz, single-tone or single-frequency, and time-spanning, according to some embodiments. The low-complexity channel may employ a default modulation such as QPSK and a default demodulation reference signal, according to some embodiments. Messages transmitted by user devices may be aligned with the resource grid and may be managed by base station using time-alignment messages in some embodiments, and in other embodiments the messages may have no synchronization with the base station's resource grid. User devices may be expected to monitor the channel during an LBT (listen-before-talk) interval before transmitting to avoid message collisions.

The systems and methods disclosed herein include a "hailing" message, which is a message broadcast by a prospective user device on a predetermined hailing channel at a predetermined hailing frequency, configured to prompt a responsive reply message from one or more receiving entities such as base stations or vehicles or fixed assets. The hailing message may indicate that it is a hailing message by including a code, such as a hailing-message code termed a "type-code" herein. The hailing message or its hailing type-code may implicitly indicate that any wireless entities that receive the message are requested to transmit a reply message if they are able to communicate with new users. The hailing device may then transmit an "introductory message" to one of the entities, requesting further communication and/or entry into a cell or LAN. For example, the user device may broadcast a hailing message to find and register on a proximate base station, or to localize and communicate with another vehicle, or to make initial contact with another wireless entity of any type. The hailing message may include an indication, termed a "seek-code" herein, indicating whether the hailing user device seeks contact with a base station, a fellow vehicle, or any receiver without restriction (that is, V2N, V2V, or V2X) according to the seek-code in the hailing message. Thus the hailing message, by indicating that it is a hailing message, thereby implicitly requests a reply message from base stations or other entities that receive it. Alternatively, a seek-code included in the hailing message may explicitly request a reply message from wireless entities of the indicated type.

The "introductory message" is a message transmitted by the user device to one of the entities that have responded to its hailing message. The introductory message provides information about the hailing user device and requests further communication. If the responding entity is a base station, the introductory message may be a random access preamble transmitted on the base station's random access channel, which is a request to join the base station's cell. Alternatively, if the user device wishes to communicate on the hailing channel, the introductory message may indicate that the user device is a reduced-capability device and/or requests continuing communication on the hailing channel or other low-complexity channel. If the responding entity is a vehicle, the introductory message may be a sidelink message addressed to the responding vehicle. If the responding entity is another type of wireless transmitter, the introductory message may be addressed to the responding entity and/or may include information about the hailing user device.

In some embodiments, the hailing channel may be a low-complexity channel, may be separate from the scheduled channels of 5G/6G, and may be configured to accommodate at-will transmissions from reduced-capability user devices. Prospective users may then broadcast hailing messages on the hailing channel to make first contact with a base station, for example. In some embodiments, a hailing message may indicate the location of the hailing node and/or an identification code and/or other information about the prospective user device or its requirements.

In some embodiments, the hailing message and the reply messages may be configured to enable the hailing user device to select the closest responding entity (or the one with the strongest signal) for communication. For example, the responding entities may be configured to wait a "reply delay" interval before responding to the hailing message, wherein the reply delay is calculated according to the amplitude or strength of the hailing message, as-received by the responding entity. For example, a responding entity may delay a shorter time if the received amplitude of the hailing message is higher than a predetermined value, and a longer time if the received amplitude is lower. Alternatively, the replying entities may include a formula or algorithm configured to calculate the reply delay according to the measured signal amplitude or received power level. Such an amplitude-dependent reply delay may thereby provide that the entity with the strongest received signal replies soonest and the entity with the weakest received signal replies last, or at least much later than the soonest one. The closest responding entity is then the first to reply since it likely has the highest received signal. The user device may then communicate with the first-replying entity, thereby obtaining the best signal reception. In most cases, communication is reciprocal, which means that the user device will likely get the best reception from the entity that receives the hailing message with the highest amplitude. In some embodiments, the reply messages may include information about each replying entity, such as its ID code, or a particular frequency on which the hailing user device can communicate directly with the replying entity, for example.

In other embodiments, a plurality of entities may receive a hailing message, but only one of the entities may reply to the hailing message. The entities may communicate with each other to determine which one will reply. For example, a base station with low traffic density may volunteer to reply to the hailing message even if it is not the closest one, whereas another base station that is heavily loaded may decline to reply even if it is the closest one. In some embodiments, an algorithm based on artificial intelligence or machine learning may be used by the base stations to determine which base station will reply to the hailing message.

In the V2X application, a vehicle may seek communication with any receiver in range. Wireless entities proximate to the vehicle may receive the vehicle's hailing message and may then reply, after a reply delay based on received signal strength. The V2X hailing message and/or the reply message may include a code identifying the transmitting entity, such as its MAC (media access control) address, so that the vehicle and other wireless devices may then communicate unicast, as long as they are in range of each other. The V2X reply delay may be configured to avoid message collisions. If the reply delay is inversely related to the amplitude of the as-received hailing message, the reply messages will be distributed in time, thereby avoiding most message collisions. Alternatively, each reply may be delayed randomly (within a predetermined maximum limit) to avoid message collisions. Such a randomly-selected reply delay may be necessary if a large number of other vehicles are nearby in closely-spaced traffic, since the amplitude-dependent delay may be insufficient to separate the replies in time. In addition, each replying entity may perform a listen-before-talk (LBT) delay before transmitting.

Turning now to the figures, FIG. 1A is a sketch showing an exemplary embodiment of a hailing message broadcast by a prospective user to multiple base stations (or other wireless entities), according to some embodiments. As depicted in this non-limiting example, a user device 100, depicted as a vehicle, may transmit a hailing message 109, which may be received by nearby entities, depicted as base station antennas 101, 102, 103, 104, 105, and 106. The base stations 101-106 may be at different distances from the user device 100, one such distance indicated by an arrow 108. Due to spreading and attenuation of the signal, the hailing message 109 may arrive at each base station 101-106 with a different amplitude or power density. The base stations 101-106 may be configured to measure the received amplitude or power of the hailing message 109 and to transmit a reply after a calculated reply delay. The reply delay may be calculated inversely according to the received amplitude or power, such as delaying longer if the received amplitude is lower, and delaying less if the received amplitude is larger. The nearest base station, which in this case is 101, may have the highest received amplitude, and therefore may calculate the shortest delay, and therefore may be the first to reply. The user device 100 may be configured to communicate with the first-replying base station or entity. Since electromagnetic propagation is usually similar in both directions, the user device is likely to have the best signal reception from whichever entity receives the hailing message with the highest amplitude. In some embodiments, the remaining base stations 102-106 may reply later, after a reply delay calculated according to their lower received amplitudes. In other embodiments, the remaining base stations 102-106 may detect the earlier reply from base station 101, and therefore may decline to respond at all. (Note that the reply delays are not due to the signal travel time from the hailing node to each receiving entity. The propagation time is negligible. The reply delays are calculated according to the received signal amplitude, and are imposed intentionally before each reply is transmitted.)

In some embodiments, the user device 100 may determine that more than one hailing frequency is available at a particular location, such as a boundary between two networking regions, or a region in which vehicles and fixed assets use different hailing frequencies. For example, a first hailing frequency may be monitored by a first set of base stations and a second hailing frequency may be monitored by a second set of base stations (or other entities). The user device may transmit a first hailing message on the first hailing frequency and receive one or more reply messages from the first set of base stations, and may transmit a second hailing message on the second hailing frequency and receive one or more additional reply messages from the second set of base stations. The user device may then select, from the various reply messages, whichever one arrives at the user device with the least delay. The user device can thereby communicate with the receiving entity in either set that provides the best signal.

In some embodiments, the icons marked 101-106 may represent wireless devices other than base stations, such as other vehicles, mobile phones, automated toll booths, and innumerable other wireless devices. Likewise, the user device 100 may represent a wireless entity other than a vehicle, such as a wireless phone or a portable computer.

In some embodiments, the reply delay may be configured inversely to the received amplitude. In other embodiments, the reply delay may be determined randomly, or otherwise.

In some embodiments, the user device 100 and replying entities 101-106 may communicate on the same hailing channel after the user device 100 selects one of them for further communication. In other embodiments, the user device 100 and the first-replying entity 101 may continue communicating on another channel allocated for V2X or X2X messaging.

In some embodiments, the hailing message may include an indication, such as a code or flag, of the type of entity sought by the user device 100. The other entities 102-106 may then determine whether to reply according to their type. For example, the hailing message may indicate that the user device 100 seeks other vehicles (V2V) or base stations (V2N) or any wireless entity (V2X). In other embodiments, separate hailing frequencies may be allocated to each type of entity so they can communicate without interference. In that case, the user device 100 may transmit the hailing message on whichever frequency corresponds to the type of entity being sought.

In some embodiments, a publicly accessible tabulation of hailing frequencies may be maintained and configured to be available to user devices. The tabulation may list hailing frequencies according to location and, optionally, the type of entity sought. For example, the tabulation may be available on the Internet, or included in a wireless device, or provided on a plug-in card such as a SIM card, among many other means of providing the tabulation. A user device may then determine, from the tabulation, which frequency to use for transmitting hailing messages based on location. In some embodiments, the tabulation may also indicate other parameters that the user device may need, such as the communication bandwidths, modulation types, formats, and so forth in use on each hailing frequency. For example, a reduced-capability user device may select, according to information in the tabulation, a hailing frequency that supports low-complexity messaging, whereas a more demanding user may select a hailing frequency reserved for high-performance communications.

Figure 1B:
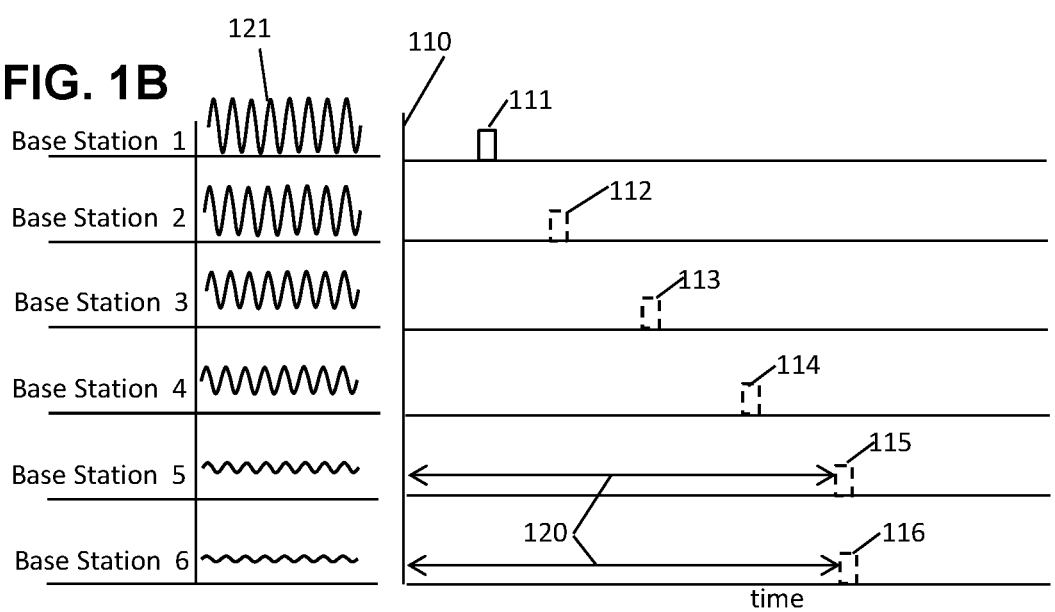
FIG. 1B is a chart showing an exemplary embodiment of a series of responses to a hailing message, according to some embodiments.

FIG. 1B is a chart showing an exemplary embodiment of the hailing message as received by various base stations, according to some embodiments. As depicted in this non-limiting example, six base stations, such as those of FIG. 1A, receive a hailing message. Sine waves 121 depict the amplitude of the hailing message as received by each of the base stations. Base station 1 has the strongest received signal and base station 6 has the weakest. Each base station then transmits a reply message after a reply delay. The reply delay is calculated by each base station to be inversely related to the received amplitude, so that the base station with the largest received amplitude calculates the shortest delay and replies first.

Also shown is a sequence chart with time horizontal, indicating when the base stations send their reply messages. The reply messages are labeled as 111, 112, 113, 114, 115, and 116, and are positioned relative to the time of the hailing message which is at time 110. Base station 1 gas the largest received amplitude and therefore the shortest delay, and therefore is the first to transmit its reply message 111. The other reply messages 112-116 are shown dashed because, in this case, each base station monitors the hailing channel and refrains from transmitting if they detect another base station's reply during their delay time. Base station 1, on the other hand, did not refrain from transmitting because it did not detect any other reply message during its delay, and therefore transmitted its reply 111 first. The other base stations refrained from transmitting their replies 112-116 after detecting base station 1's reply 111. (In another embodiment, described below, all the base stations transmit their replies regardless of whether they detect another reply, so that the hailing user device can select which base station to communicate with.)

In some embodiments, a maximum delay time may be predetermined, such that base stations calculating their reply delays are limited to no greater than the maximum delay time. The maximum delay time, labeled 120, may enable the hailing user device to determine when to expect the last of the responses. Accordingly, base stations 5 and 6 transmit their reply messages 115-116 at the maximum time 120, although their different received amplitudes would otherwise cause them to calculate different, and longer, delay times. In some embodiments, each base station may be configured to add or subtract a small random extra time to the maximum delay time 120, so that their transmissions are less likely to collide. In a remote or sparsely-covered wireless environment, the nearest base station to a user device may be quite distant, and therefore may be the only base station able to reply to the hailing message. In that case, the user device may detect the solo reply message at the maximum time and may attempt to communicate with that base station. Since communication may be difficult at long range, the user device and the base station may employ procedures to enhance reliability, such as increasing the transmission power, reducing the data rate, transmitting messages twice, and so forth. In addition, if the user device has received no replies within the maximum delay time, then the user device can conclude that there is no coverage at this location.

In some embodiments, a second user device may seek entry at about the same time as a first user device. In that case, the second user device can monitor the hailing frequency and detect the first user device's hailing message. The second user device can then wait until the maximum delay time after the first user device's hailing message, and then may transmit its own hailing message, knowing that the second hailing message is not interfering with any replies to the first hailing message. In other embodiments, the second user device may monitor the various base station replies and determine, from the amplitude of each of the reply messages as received by the second user device, how close each base station is to the second user device. The second user device can then select the base station with the largest as-received amplitude at the location of the second user device, and can log on to that base station. Preferably the second user does not select the first-replying base station, because the first user device is about to communicate with that one. However, if the first-replying base station is indeed the one with the best reception at the second user device, then the second user device may wait until the first user device has finished logging on and then may seek communication with that same base station. Since the second user device has already decided which base station to use, there is no need to transmit another hailing message.

An advantage of allocating a particular frequency for hailing messages may be that a user device may locate and communicate with a proximate base station, and can select the one that provides the best reception. Another advantage may be that the user device may avoid the arduous frequency search to locate the base station. An advantage of a maximum delay time may be that the user device, and other waiting user devices, may thereby know when all of the hailing replies are finished.

Another advantage may be that the depicted low-complexity procedures may be compatible with devices that may have difficulty complying with prior-art registration procedures. Another advantage may be that the depicted procedures of FIG. 1A or 1B may be implemented as a software (or firmware) update, without requiring new hardware development, and therefore may be implemented at low cost, according to some embodiments. The procedures of FIG. 1A or 1B may be implemented as a system or apparatus, a method, or instructions in non-transient computer-readable media for causing a computing environment, such as a user device, a base station, or other signally coupled component of a wireless network, to implement the procedure. The advantages listed in this paragraph are true for each of the lists of advantages in examples below. Particular embodiments may include one, some, or none of the above-mentioned advantages. Other advantages will be apparent to one of ordinary skill in the art, given this teaching. This comment applies additionally to other lists of advantages provided below.

The systems and methods disclosed herein further include procedures enabling a user device to initiate communication with a suitable proximate base station, as described in the following examples.

Figure 2A:
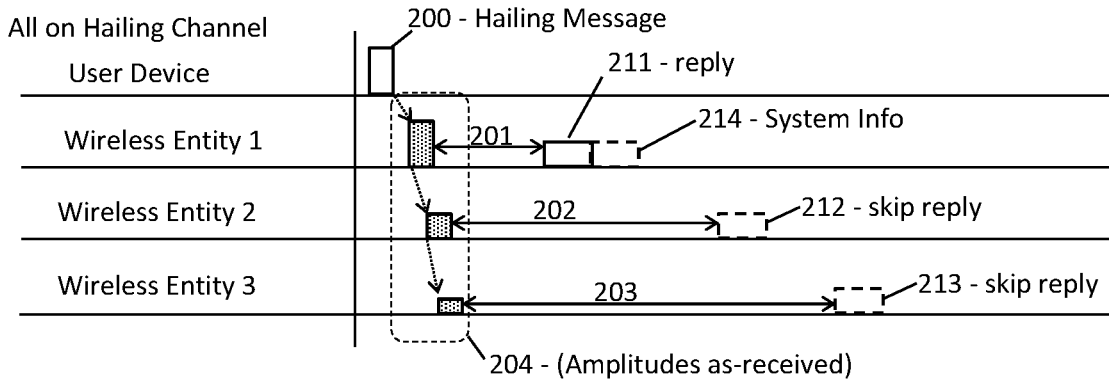
FIG. 2A is a sequence chart showing an exemplary embodiment of a process for user device to make initial contact with a network, according to some embodiments.

FIG. 2A is a sequence chart showing an exemplary embodiment of a low-complexity procedure for discovering and making contact with a base station or other entity, according to some embodiments. Horizontal lines show messages of the user device and of three wireless entities such as base stations. As depicted in this non-limiting example, the messages are all on a particular hailing channel, which is a frequency or frequency band allocated for initial contact messages. A prospective user device may broadcast a hailing message on the hailing channel and then wait for one or more reply messages from a proximate base station (or other entity), on the same hailing channel. The hailing channel may be monitored by multiple base stations for detecting the hailing messages and responding to them.

First, the user device transmits a hailing message 200 on the hailing channel. The hailing message may contain a code or other indication that the message 200 is a hailing message from a prospective user device, and may also include a demodulation reference and/or an identification code of the user device and/or a location of the user device, and/or flags, and/or a code indicating which type of entity is being sought, and/or other data.

The hailing message 200 then propagates outward, and attenuates as it propagates due to spreading of the signal, atmospheric absorption, scattering, intervening buildings or hills, and other attenuation causes. Assuming that the three entities are located at three different distances from the user device, or at least that they have different attenuation factors, the hailing message 200 will be received differently at each of the receivers. In the figure, three stippled bars are shown, labeled as 204, indicating graphically the signal strength as-received at each of the three entities. The three stippled bars 204 thus indicate, by their height, that entity 1 has the best received signal strength and entity 3 has the worst received signal. Therefore, the user device will probably have the best reception from entity 1.

The entities may be configured to measure their as-received amplitude of the hailing message 200, and may then reply after a calculated reply delay, according to some embodiments. The reply message may be transmitted on the same hailing frequency, as depicted, or alternatively on another frequency allocated for reply messages. The reply delay may be calculated according to the received signal strength, so that the entity with the best received signal may be the first to reply. For example, the reply delay may be longer for a weaker received signal and shorter for a stronger received signal. The inversely-amplitude-dependent reply delay may thereby cause the entity with the best reception to answer the hailing message first. The other entities, having received weaker signals, are still delaying when the first entity transmits its reply message. The other entities may detect the first entity's reply message 211, and therefore they may then decline to reply, or they may reply anyway, depending on the embodiment.

The entities may be configured to calculate their reply delays in a consistent manner, according to some embodiments. The entities may be configured to measure their received signal amplitudes in the same way. For example, each entity may include a memory with instructions for calculating a delay value according to an amplitude value, such as a delay inversely related to the amplitude (that is, a longer delay for a weaker signal and a shorter delay for a stronger signal as-received). Each entity may be equipped with the same (or functionally equivalent) calculation instructions, so that their delays are ordered according to a commonly agreed measure of amplitude strength or signal quality.

The receiving entities may calibrate their receivers so that they all calculate the delay consistently. For example, a mobile transmitter with an isotropic emission may transmit a test message, or a hailing message, from various known locations, and the various receivers may measure their received amplitudes at their locations. The entities may then adjust their receiver gains, or a threshold value, or other equivalent parameter, to calibrate their amplitude values consistently with each other. The entities may then use the calibrated values for calculating their reply delays in a consistent manner.

The three delays 201, 202, and 203 are shown successively longer, according to the successively smaller received amplitudes 204 of the three entities. Accordingly, entity 1 has the highest amplitude and the shortest delay. Then, after the entity 1 delay 201, entity 1, having detected no other replies during its delay 201, therefore transmits its reply 211. The reply in this case is an identification message 211 indicating the identity or MAC address or the like, of entity 1. In addition, (optionally in dash) entity 1 may include a system information message 214, which may assist the user device by providing a frequency of an entry channel, such as a random access channel or the like. In the mean time, entities 2 and 3 detect entity 1's reply 211 and therefore do not respond. Their avoided reply messages ("skip reply") are shown dashed as 212 and 213. In this way, the user device may become connected with the closest entity (or the one with the best reception), and may also receive system information, without having to perform a blind search across a frequency raster, which may be a significant savings in time and complexity.

In some embodiments, the reply message 211 may include a frequency redirect message. A "redirect" is a short message indicating a different frequency. For example, the redirect message may indicate a PBCH frequency, where the user device may obtain system information while avoiding the frequency raster search.

In some embodiments, the reply message 211 may be a low-complexity message, configured to enable a reduced-capability user device to communicate on a low-complexity channel without performing complex procedures required of high-performance user devices. For example, the reply message 211 may be an entry message including an assigned temporary identification code, which the user device may then use when continuing to communicate at-will on the low-complexity hailing channel or another low-complexity channel allocated for reduced-capability device communications.

In some embodiments, a base station may detect a user device's hailing message, but that base station may be closed (such as proprietary or private or classified cell, for example). In that case, the closed base station may ignore the hailing message, even if it has the best reception. However, if the hailing message includes an emergency flag, then the base station with the best reception may reply even if closed, since emergency messaging is a higher priority.

Since the hailing channel may be accessible to multiple prospective user devices, there is a possibility of a collision between hailing messages if two user devices transmit hailing messages at the same time. To minimize collisions and other confusion, the user devices may apply an LBT or listen-before-talk interval before transmitting, according to some embodiments. The LBT interval may be a predetermined interval long enough to detect cross traffic on the hailing channel. If a first user device and a second user device both wish to send hailing messages, and the second user device detects the first user device's hailing message during the LBT interval, then the second user device may withhold its hailing message until after the various base stations have finished replying to the first user device's hailing message, and only then may issue its own hailing message. For example, the second user device may wait until the maximum reply delay limit has been reached, and then may transmit its own hailing message.

In some embodiments, the second user device may measure the amplitude of the first user device's hailing message and determine that the second user device is probably close to the first user device based on the received amplitude. The second user device may then receive the first reply message, and note the redirect frequency or system information included in that reply message, notwithstanding that the reply message was intended for the other user device. The second user device may then wait until the first user device has completed its communication with the selected base station, and then may communicate with the same base station on the provided frequency. Since the first and second user devices are close, in this example, the same base station may serve them both.

Since the hailing channel may be shared by numerous base stations or other entities, there is a possibility of a collision between the reply messages. For example, in case two base stations measure the same as-received amplitude, they may calculate the same delay, and their reply messages may collide or interfere. In that case, the user device may receive a garbled reply from those two base stations. The colliding base stations may not be able to determine that the collision has occurred if they both start at the same time. In that case, the user device may wait a delay corresponding to the maximum reply delay limit, and may then re-transmit its hailing message a second time. The two base stations that had transmitted replies to the first hailing message may then conclude, upon receiving the second hailing message, that their first replies were not received successfully, presumably due to a collision. To prevent another collision, the two base stations that transmitted replies to the first hailing message may then reply again to the second hailing message, but with their delays modified by randomly selected additional delays. The random additional delays may make a second collision unlikely. Then, whichever base station happens to reply sooner may prevail, and the other one may remain silent.

While the depicted example has been described with reference to vehicles communicating with base stations, the principles may be applied as well to V2X and X2X applications in which the vehicle (or other entity) seeks communication with any type of receiver including other vehicles, other mobile terminals, and fixed assets. Each aspect described with reference to vehicle-base station hailing and replies in the examples below may be adapted straightforwardly to the V2X and X2X applications, by substituting "wireless device" for "base station" in each instance, as will be apparent to artisans with ordinary skill after reading the current disclosure.

Figure 2B:
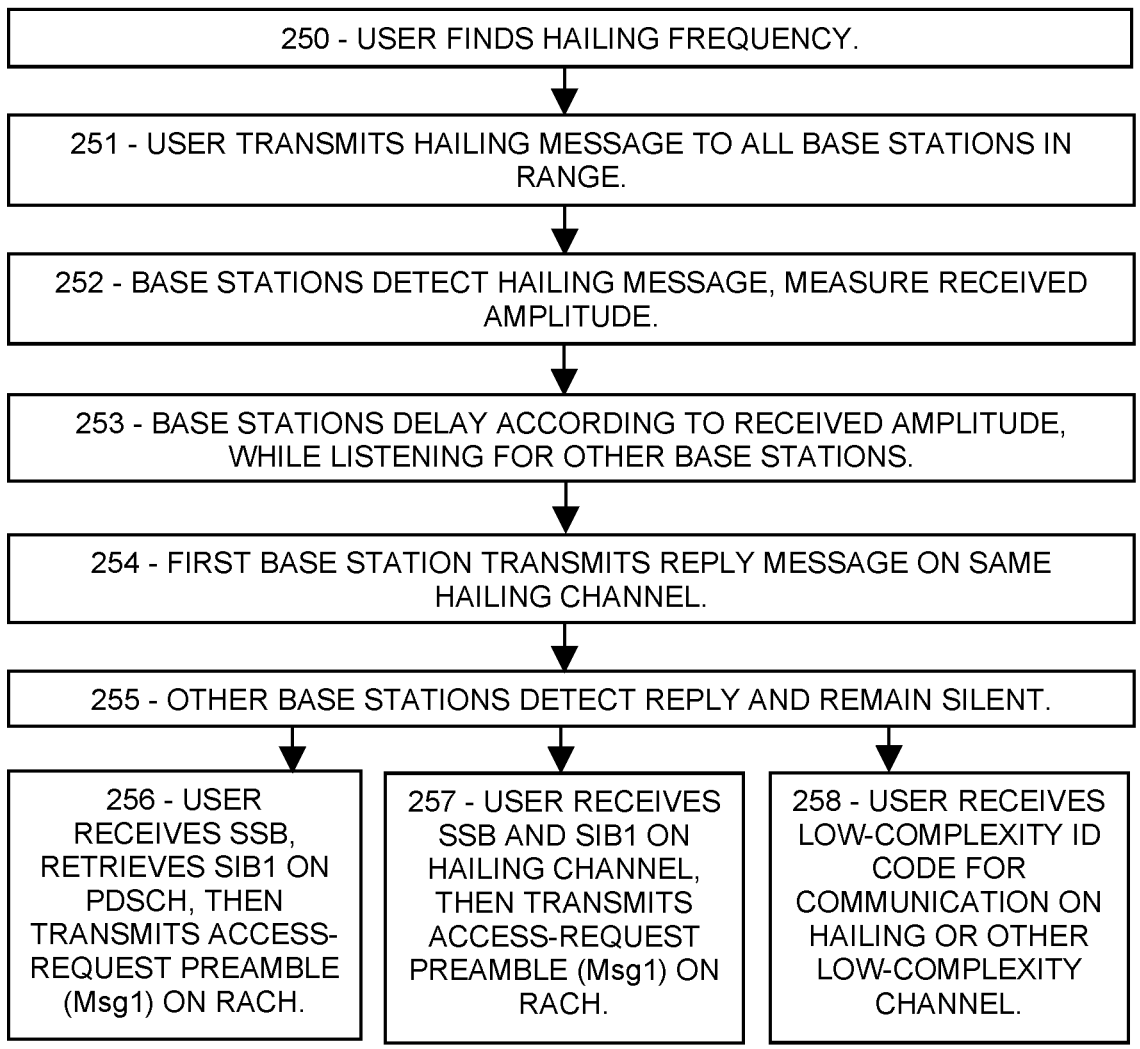
FIG. 2B is a flowchart showing an exemplary embodiment of a process for a user device to make initial contact with a network, according to some embodiments.

FIG. 2B is a flowchart showing an exemplary embodiment of a procedure for finding and contacting a closest base station, according to some embodiments. As depicted in this non-limiting example, at 250, a prospective user device determines a frequency of a hailing channel. The frequency may be a standard and universal frequency such as 1000 MHz, or it may be specified according to location, or provided in a network database, or on-line, or built-in to the user device, or previously obtained, or otherwise. At 251, the user device transmits a hailing message on the hailing channel. The hailing message is transmitted as a broadcast, intended for all base stations that can receive it. At 252, one or more base stations receive the hailing message and measure the received amplitude (or received power or other measure of signal quality) of the message. Each base station then calculates a reply delay using a formula (or other calculation tool) based on the measured signal amplitude. The formula may be configured to provide longer delays for lower signal amplitudes, and shorter delays for higher signal amplitudes. The base stations then delay 253 by each of their calculated reply delay times, while listening for (or attempting to receive) another base station's reply on the hailing channel during that delay. At 254, a first base station's reply delay expires without detecting another base station's reply, and therefore the first base station transmits a reply message. In a first embodiment, the reply message merely identifies the base station. In a second embodiment, the reply message may include system information such as an SSB message, and may optionally be followed by an SIB1 message, all optionally transmitted on the same hailing frequency or an associated frequency band. In a third embodiment, the reply message may be a frequency redirect to that base station's entry channel such as its PBCH broadcast channel, on which the user device may receive the system information. In a fourth embodiment, the reply message may include a temporary identification that allows the user device (such as a reduced-capability device) to continue transmitting short messages at-will on the hailing frequency.

At 255, the other base stations detect the first base station's reply, and therefore they remain silent, or at least avoid replying to the hailing message, in this example. The user device then transmits an introductory message to the selected base station, the type of reply message depending on the type of communication that the user device seeks to have with the responding entity. At 256, 257, and 258, three alternative outcomes are shown. At 256, the user device receives the reply message which is an SSB message, navigates to the downlink shared channel, and receives the SIB1 message, and then transmits a preamble requesting access on the random access channel. Alternatively, at 257 the user device may receive both the SSB and SIB1 messages on the hailing channel, and may then transmit the access preamble on the random access channel. As a further alternative, at 258, the user device may receive an identification code and other information enabling the user device to continue communicating with the base station on the hailing channel, or other allocated frequency, using low-complexity procedures.

An advantage of providing a hailing channel on a particular frequency for user devices to initiate contact at-will, may be that the separate channel may avoid interfering with established users on the scheduled channels. Another advantage may be that the low-complexity hailing protocols may reduce the computational demands for reduced-capability devices. An advantage of the base stations replying on the same hailing channel may be that the user device is already on that frequency and therefore may be ready to detect a reply when it occurs. An advantage of other prospective user devices listening on the hailing channel before transmitting, and withholding their hailing messages if they detect another device's hailing message, may be that collisions may be avoided. An advantage of the base stations replying to a hailing message after a reply delay which is inversely related to the received amplitude, may be that the user device may connect with the closest base station (or the one with the best reception). Another advantage may be that the user device may register on the selected base station without wasting time on a frequency raster blind search and other steps for initial access. An advantage of the base stations listening on the hailing channel during their delay times, and refraining from replying if another base station replies first, may be to avoid collisions and redundant replies. An advantage of using a standard universal frequency for the hailing channel may be that prospective user devices may readily locate base stations and select among them for the best reception. Another advantage may be that base stations may monitor just a single frequency to detect prospective new users, thereby reducing demands on the base stations. An advantage of the prospective user transmitting a hailing message to multiple base stations may be that the user device may thereby solicit replies from multiple base stations at one time.

Figure 3A:
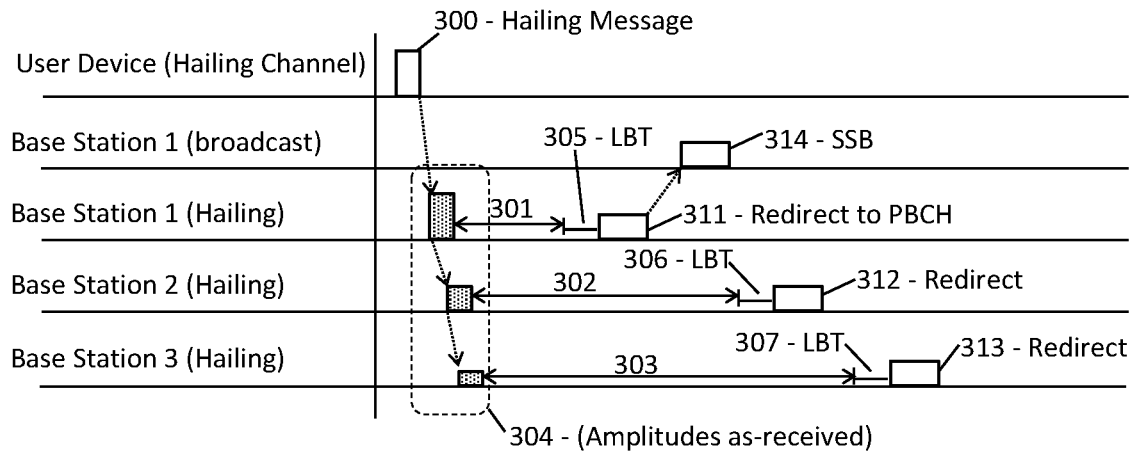
FIG. 3A is a sequence chart showing another exemplary embodiment of a process for a user device to make initial contact with a network, according to some embodiments.

FIG. 3A is a sequence chart showing another exemplary embodiment of a process for a user device to make initial contact with a network, according to some embodiments. Horizontal lines indicate messages of the user device on a hailing channel, base station 1 on its PBCH, and base stations 1, 2, and 3 on the hailing channel. As depicted in this non-limiting example, the user device transmits a hailing message 300 on a hailing channel and then monitors the same hailing channel for a response from base stations nearby. The hailing message 300 is received by the three base stations, each base station having a different as-received amplitude because they are at different distances. In this example, base station 1 is the closest and base station 3 is farthest from the user device. Accordingly, the received amplitudes (suggested by the sizes of the stippled boxes 304) range from a high amplitude for base station 1 to a low amplitude for base station 3. The base stations are configured to delay before replying, the delay being longer for a low-amplitude reception and shorter for a high-amplitude reception, so that the user device can determine, from the first reply, which base station is closest. In this example, the delays 301, 302, and 303 of base stations 1, 2, and 3 are inversely related to the amplitudes of the as-received signals 304. After each delay, the base stations listen on the hailing channel to avoid colliding with an ongoing message (LBT intervals shown 305, 306, 307) and then they transmit their replies 311, 312, and 313. In this example, all of the base stations that receive the hailing message 300 transmit a reply message 311, 312, and 313. In this example, each reply message 311, 312, 313 is a redirect (that is, a message specifying a different frequency that the recipient may switch to). Each reply message includes a frequency redirect pointer to the broadcast channel of the replying base station. For example, the reply message 311 of base station 1 instructs the user device to switch to the broadcast channel of base station 1, and likewise for messages 312 and 313. (For clarity, the broadcast channels of base stations 2 and 3 are not depicted). The user device then follows the redirect to the broadcast channel of base station 1 since it was the first replying base station. The user device then receives a periodically-transmitted SSB message 314 on that broadcast channel. The user device then continues the registration process from that point. The user device has thereby selected the closest base station (or the one with the best signal), and has found the first system information message, all without performing a blind search.

A collision between base station reply messages on the hailing channel is still possible, despite the LBT intervals, because two base stations may have the same received amplitude and the same calculated delay. If the first two base station messages are transmitted at the same time and collide, the user device would receive a garbled redirect and may continue listening for a better response. If the third reply message follows closely after the first two responses, the user device may conclude that the third base station is only slightly farther away than the first two, and therefore may proceed to join the non-colliding base station. However, if the third reply is substantially later, such as twice as delayed as the first two, then the user device may reject them all and try again by sending another hailing message (after a sufficient delay to ensure that all base station replies had finished). The first two base stations may then receive the second hailing message, and may conclude from it that their first replies had likely collided. To avoid a second collision, they may add or subtract a random small delay to their amplitude-dependent delay values, so that their second reply messages likely would not collide a second time, especially if they both use LBT intervals to detect a preceding transmission. The user device may then receive replies to its second hailing message, select whichever reply signal arrives first without collision, follow the redirect in that reply message, receive an SSB message on the selected base station's broadcast channel, and continue joining that base station.

If a second user device also wishes to find and communicate with a suitable base station, the second user device may detect the first user device's hailing message 300, and therefore may withhold its own hailing message to avoid interfering with the first user device's process. However, the second user device may also receive the various reply messages 311, 312, 313 and may compare the amplitudes, or other measure of signal quality, of each as-received reply messages 311, 312, 313. Then the second user device may select whichever base station transmitted the reply message that was received, by the second user device, with the best amplitude. If the second user device prefers the first reply message, then the second user device may wait until the first user device has completed its communications with the first base station, to avoid colliding with the first base station's messages. However, if one of the other reply messages (the third one, for example) has the highest amplitude as-received by the second user device, then the second user device may immediately follow that redirect and communicate with the third base station. In that case, the second user device need not worry that its messages would collide with the first user device, since it is unlikely that the first user device would choose the third reply message over the first one. This version of the procedure may depend on (a) multiple base stations replying to the hailing message instead of withholding their replies, and (b) on each reply message being a redirect so that the subsequent communications do not clog the hailing channel.

Figure 3B:
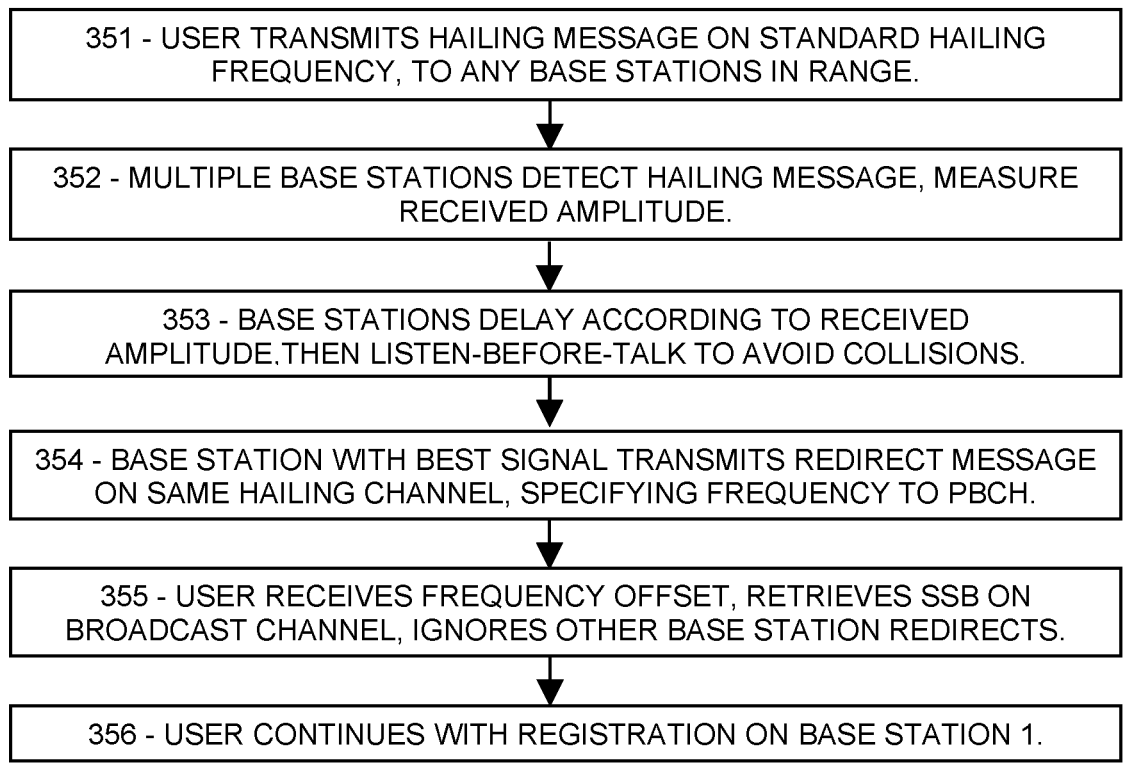
FIG. 3B is a flowchart showing another exemplary embodiment of a process for a user device to make initial contact with a network, according to some embodiments.

FIG. 3B is a flowchart showing another exemplary embodiment of a process for a user device to make initial contact with a network, according to some embodiments. As depicted in this non-limiting example, at 351, the user device transmits a hailing message on a hailing channel at a particular hailing frequency, which has been allocated for that purpose. Base stations are configured to monitor that frequency to assist new entrants into their network. At 352, multiple base stations detect the hailing message, and measure the received amplitude (or other measure of signal quality), and at 353 they calculate delay values inversely related to the received amplitudes. Each base station delays by that calculated amount, then checks for traffic during an LBT interval to avoid collisions, and then transmits its reply on the same hailing channel. (However, if the base station monitors the hailing channel continuously during its delay interval, then a separate LBT interval may not be required.) At 354, the base station with the largest received amplitude, and hence the shortest delay, transmits its reply message on the hailing channel. The reply message is a frequency redirect toward that base station's broadcast channel, which carries the SSB periodically. At 355, the user device receives the redirect message, switches to the broadcast channel, and receives the SSB message. The user device may ignore the other response messages. In another embodiment, the user device may store the other redirects, to use in case there is a problem with the first one. At 356 the user device continues to register with the first base station by receiving the SIB1 message and transmitting a preamble on the random access channel.

An advantage of the base stations replying on the same frequency as the hailing message may be simplicity, since the user device may receive the replies without changing frequency. Another advantage may be that the base stations may detect the hailing message, the reply messages of other base stations, and any additional hailing messages that may be transmitted during the reply period, on that same frequency. Another advantage may be that the user device may select a suitable base station without performing a blind search through multiple frequencies. An advantage of the base stations listening on the hailing channel before transmitting their reply messages may be to avoid colliding with an ongoing response from another base station. An advantage of the base stations using their reply messages to redirect the user device to their respective broadcast channels may be to keep the hailing channel free for future hailing messages, rather than occupying the hailing channel with the bulky system information messages. Another advantage may be to minimize redundant transmissions by sending the user device to the base station's regular PBCH in which the SSB is periodically transmitted, instead of providing a special unicast copy for that user device. An advantage of the user device storing the various unused reply messages may be to follow an alternative redirect in case the first one leads to an unsuitable base station. For example, if the earliest reply message redirects to a base station that is closed or incompatible with the user device's limitations or other requirements, then the user device can follow the second redirect message and attempt to join the second base station's network.

Figure 4A:
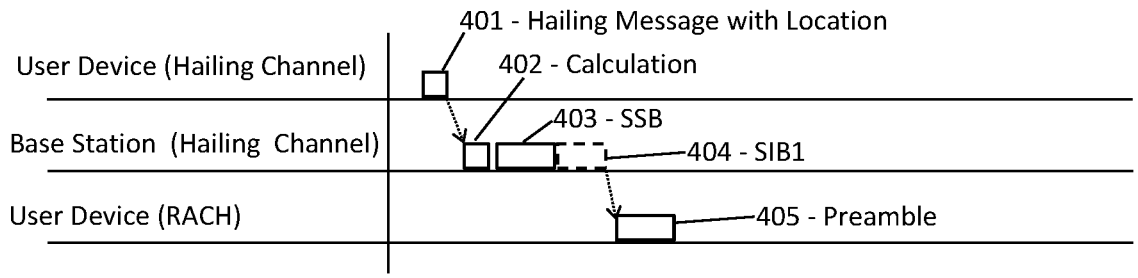
FIG. 4A is a sequence chart showing an exemplary embodiment of a process for a user device to find system information files, according to some embodiments.

FIG. 4A is a sequence chart showing an exemplary embodiment of a low-complexity procedure for base stations to select a prospective user device based on the user device's location, according to some embodiments. Horizontal lines show messages of the user device on the hailing channel, messages of a base station on the hailing channel, and messages of the user device on a random access channel. As depicted in this non-limiting example, the user device transmits a hailing message 401 that indicates the location of the hailing user device. For example, the user device may determine its coordinates (such as its latitude and longitude) using a map or navigation satellites or other means, and may include that data in the hailing message. At 402, a plurality of base stations (only one shown for clarity) have received the hailing message 401, and each base station independently calculates 402 its distance from the user device. In addition, each base station also knows where the other nearby base stations are located, and each base station calculates the distances of all the local base stations from the user device. Thus each base station calculates the distance from the user device to each base station in the proximity. Each base station then determines which base station is closest to the user device's location, and the closest base station then responds to the hailing message. The other base stations conclude that they are not closest, and they decline to respond. Thus the base stations all perform the same calculations using the same set of locations, and hence they all come to the same conclusion, specifically that a particular base station is closest. Communication between the base stations, although possible, may not be needed as long as they know the locations of the other base stations.

The closest base station transmits a reply message 403, which in this case is an SSB message. Optionally, the reply may also include an SIB1 message 404, thereby providing the user device with the information needed for communicating with the base station. The user device then transmits an introductory message (in this case a random access preamble) to the replying base station. Accordingly, the user device is shown transmitting a preamble 405 on the random access channel, initiating registration without having to perform a blind search or wait for a periodic SSB message or search for the SIB1 message. Alternatively, as in the previous example, the base station's reply message may be a redirect message, causing the user device to switch to the broadcast channel and receive the SSB there.

As a further alternative, the closest base station may respond with a temporary identification code for the user device to use on the hailing channel, or other allocated low-complexity channel. Then the user device may transmit an introductory message to the base station, and may continue to communicate with the base station, on the hailing channel (or other low-complexity channel) according to low-complexity protocols. If the user device then wishes to upgrade its status by joining the regular managed and scheduled channels, the user device may transmit a low-complexity message to the base station on the hailing channel, inquiring the broadcast frequency and optionally the timing of the next SSB transmission. The user device can then switch to the broadcast frequency, receive the SSB, and proceed to register on the managed channels.

In some cases, the closest base station may fail to respond to the hailing message, due to maintenance or lightning or other mishap. The other base stations, having calculated that they are not the closest one to the user, may decline to reply, as mentioned. However, the other base stations may continue to monitor the hailing channel, and thereby fail to detect the expected reply message of the closest one. When the closest one fails to reply within a predetermined time, the other base stations may determine that the closest one is unexpectedly indisposed, and therefore the second-closest base station may then transmit a reply message instead.

Figure 4B:
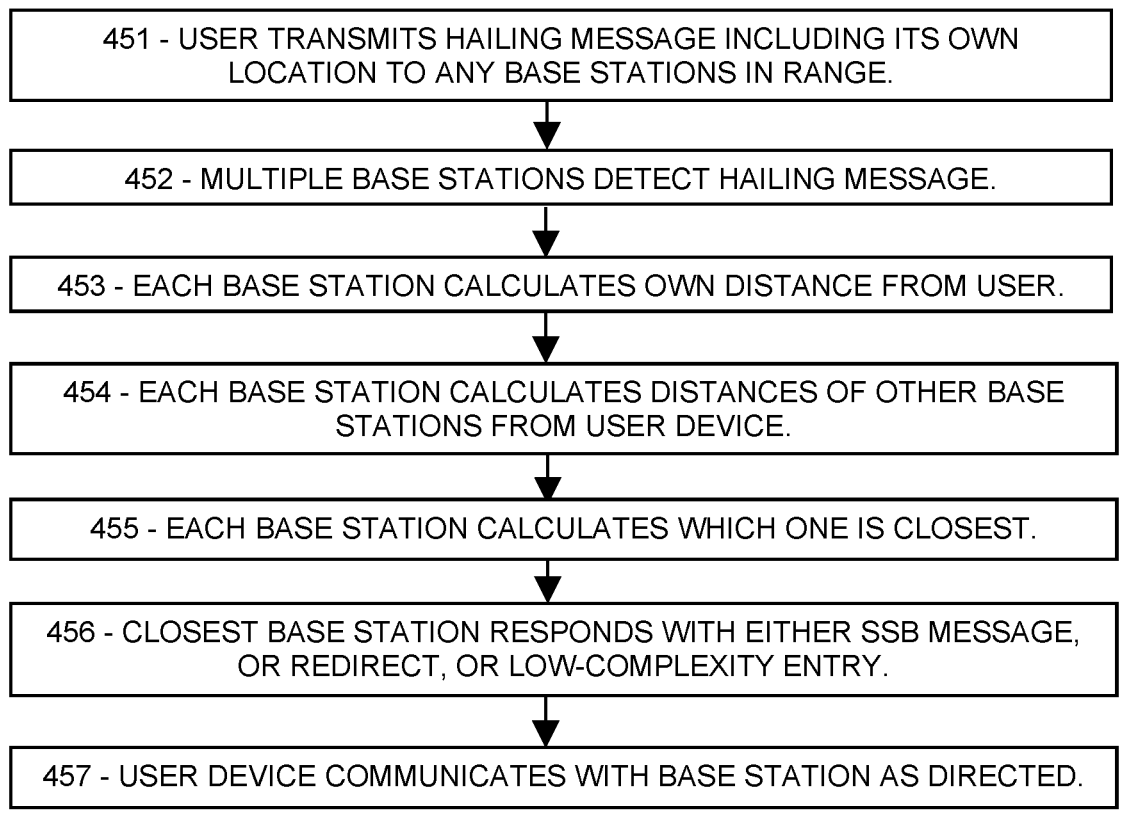
FIG. 4B is a flowchart showing an exemplary embodiment of a process for a user device to find system information files, according to some embodiments.

FIG. 4B is a flowchart showing an exemplary embodiment of a low-complexity procedure for a user device to obtain network system information, according to some embodiments. As depicted in this non-limiting example, at 451, a prospective user device transmits a hailing message on a hailing channel allocated for randomly timed messages and monitored by multiple base stations. The hailing message includes an indication of the prospective user device's location, such as latitude and longitude, a street address, map coordinates, or other location indicator recognizable to the base stations. At 452, a number of base stations in range have detected the hailing message and retrieved the user device's location information. Each base station already knows its own location, as well as the locations of the other base stations in the region. At 453, each base station calculates the distance from the prospective user device to its own location. At 454, each base station also calculates the distance from the user device to each of the other base stations. At 455, each base station determines which of the base stations is closest to the prospective user device. In this example, the base stations also know which other base stations are unavailable to accept new entrants, and may exclude those base stations from the calculations. The base stations may exchange updates as to their availability periodically, or whenever one of them changes availability, so that the other base stations will know which ones are available. Since the base stations then have the same data regarding locations and availability, they all reach the same conclusion as to which available base station is closest. At 456, the closest one responds to the hailing message by transmitting a reply message. The reply message in the depicted case is either an SSB message that provides sufficient system information to enable the prospective user device to find and receive downlink messages, or a frequency redirect indicating the base station's PBCH frequency. Alternatively, the reply message may include low-complexity entry information, such as a temporary identifier, for low-complexity messaging on the hailing channel. At 457, the user device proceeds to communicate with the base station as directed.

An advantage of a prospective user device transmitting a hailing message that includes the user device's location, may be that it enables the base stations to self-select the closest one for replying to the user device. An advantage of networks providing a hailing channel, on which multiple base stations in a region can detect hailing messages and reply to them, may be that the prospective user device may broadcast to all of the base stations in range by transmitting a single hailing message. Another advantage may be that the hailing message and the reply message, being on an allocated frequency separate from the scheduled message frequencies, may avoid interfering with the scheduled channels. An advantage of the base stations calculating the distances from the user device location to themselves, and also the distance to other proximate base stations, may be that each base station can thereby determine which of the base stations is closest, and therefore which base station is to respond. An advantage of determining which base station is closest to the prospective user device may be that the closest one may provide the best reception. An advantage of the various base stations having the same data regarding the locations of the various base stations, may be that their distance calculations may be consistent with each other. An advantage of the base station calculations all being consistent with each other may be that the base stations all reach the same conclusion as to which available base station is closest and should reply. An advantage of the base station replying with an SSB message may be that the reply thereby provides essential system information, on demand, to the prospective user device. Another advantage may be that the prospective user device may avoid doing a blind search. An advantage of providing an SIB1 message concatenated with the SSB message may be that it provides sufficient system information for the prospective user device to transmit messages to the network, without waiting for a periodic SIB1 transmission on the PDSCH. An advantage of the prospective user device transmitting a preamble message on the random access channel may be that this initiates the registration process on the regular channels while freeing up the hailing channel for other entrants. An advantage of the closest base station responding to the hailing message with a redirect message to its PBCH may be that the hailing frequency may be kept free for other hailing messages. An advantage of the base station including a low-complexity identification to the user device in the reply message may be that the user device may begin communicating with the base station upon receipt, instead of carrying out a series of complex requirements to join the scheduled channels.

Figure 5A:
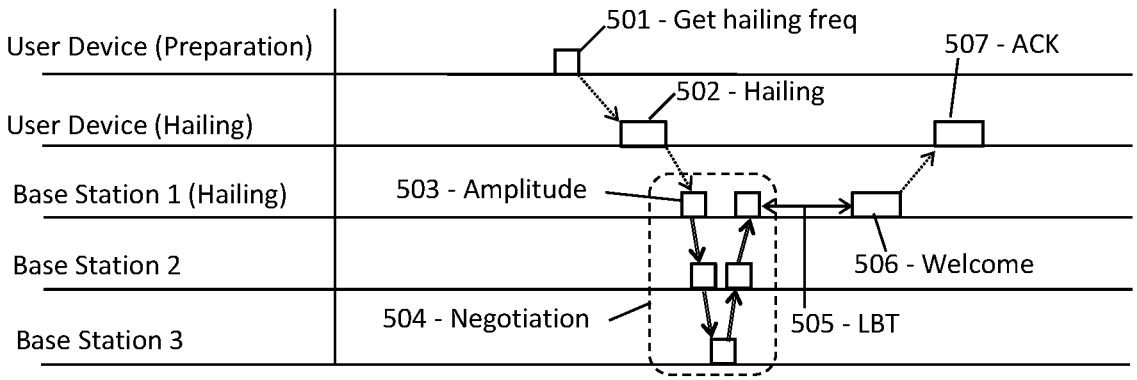
FIG. 5A is a sequence chart showing an exemplary embodiment of a process for a base station to reply to a user device, according to some embodiments.

FIG. 5A is a sequence chart showing an exemplary embodiment of a low-complexity procedure for base stations to cooperate in deciding which base station will respond to a hailing message, according to some embodiments. The horizontal lines indicate preparation steps of a prospective user device, its messages on a hailing frequency, messages of base station 1 on the hailing frequency, and actions of base stations 2 and 3. As depicted in this non-limiting example, a prospective user device determines its location 501 using satellite signals or a map or an address for example, and then determines a local hailing frequency according to the location. The prospective user device then transmits a hailing message 502 on the hailing frequency. The hailing message is received by multiple base stations (three shown) and each base station measures the amplitude of the received signal. The base stations (or their respective core networks, not shown) then communicate 503 with each other over a backhaul link (such as a cable). The negotiation (504, in dash) may include the base stations comparing their received amplitudes and other relevant data, and then determining which base station is to respond to the hailing message. For example, the base stations may select the base station that has the best received signal, which in this case is base station 1. Then, after a listen-before-talk interval 505, base station 1 replies with a welcome message 506 on the hailing frequency. In the welcome message 506, the chosen base station identifies itself and provides SSB and SIB1 system information files as well as user-specific information such as a C-RNTI identification for the user device, plus a timing adjustment and/or frequency adjustment and/or a power adjustment, configured to bring the user device's messages into compliance with the base station's resource grid. The welcome message 506 may also provide an indication of a frame boundary relative to the welcome message 506 for example, to further align the user device's timing. Alternatively, the welcome message 506 may provide a frequency redirect to the broadcast channel or other entry channel. The user device then replies with an acknowledgement 507 on the hailing frequency, after applying the frequency and timing adjustments. After registering with base station 1, the user device may then communicate using the regular 5G channels (PUSCH etc.) according to the system information provided.

In another embodiment, the user device may request that the communications continue on the hailing frequency instead of joining the scheduled channels. For example, if the user device is a very light user (that is, it has only short and infrequent messages) and if the base station supports brief general messaging on the hailing channel, the base station may concur. Using the hailing channel for brief and infrequent messaging may keep the scheduled channels clear for higher-priority users. Alternatively, the base station may redirect the user device to a random access channel or other channel allocated for light users, instead of camping on the hailing frequency. The network database and/or the base station may specify limitations or requirements for access to such a low-complexity channel, for example by specifying limits on message size, transmissions per day, QoS limits, or other predetermined limits.

As another alternative, the user device may be a temporary pass-through vehicle which seeks to transmit a single email or receive a single file while briefly in range. In that case, the transient user may, for simplicity, request to remain on the hailing frequency for the brief time.

As a further alternative, the user device may be a long-term resident of the network but with light communication needs, and therefore may wish to set up the base station connection for future use, even if the user has no messages to send at this time.

In some embodiments, the base stations may determine which base station is to respond, based in part on how much traffic each base station is carrying. For example, each base station may indicate how much traffic it is carrying or what fraction of its maximum traffic capacity is filled. Then the base stations (or a higher-level manager) may select a lightly-loaded base station that is farther from the user device, instead of a closer one that is currently heavily loaded. Sending new users to base stations that are carrying less traffic than others, is called "load-leveling".

As a further alternative, the user device may specify in its hailing message that it needs a low-complexity channel instead of the complex managed channels of regular 5G or 6G. Then the base stations, during the negotiation process, may determine which of the base stations can accommodate low-complexity communications, and therefore may select one of those base stations to reply. On the other hand, the user device may indicate, using flags for example, that it needs both low latency and high reliability, or that the message is an emergency call, or other special request. Those requirements may affect the base stations' decision as to where to send the new user, and what type of reply message would be appropriate to accommodate the needs.

In some embodiments, an administrator or other authority may decide which base station is to reply. Each of the base stations may convey their information, such as the received amplitude and current traffic conditions, to the administrator, and the administrator may then select one of the base stations to serve the user device, at least initially.

Figure 5B:
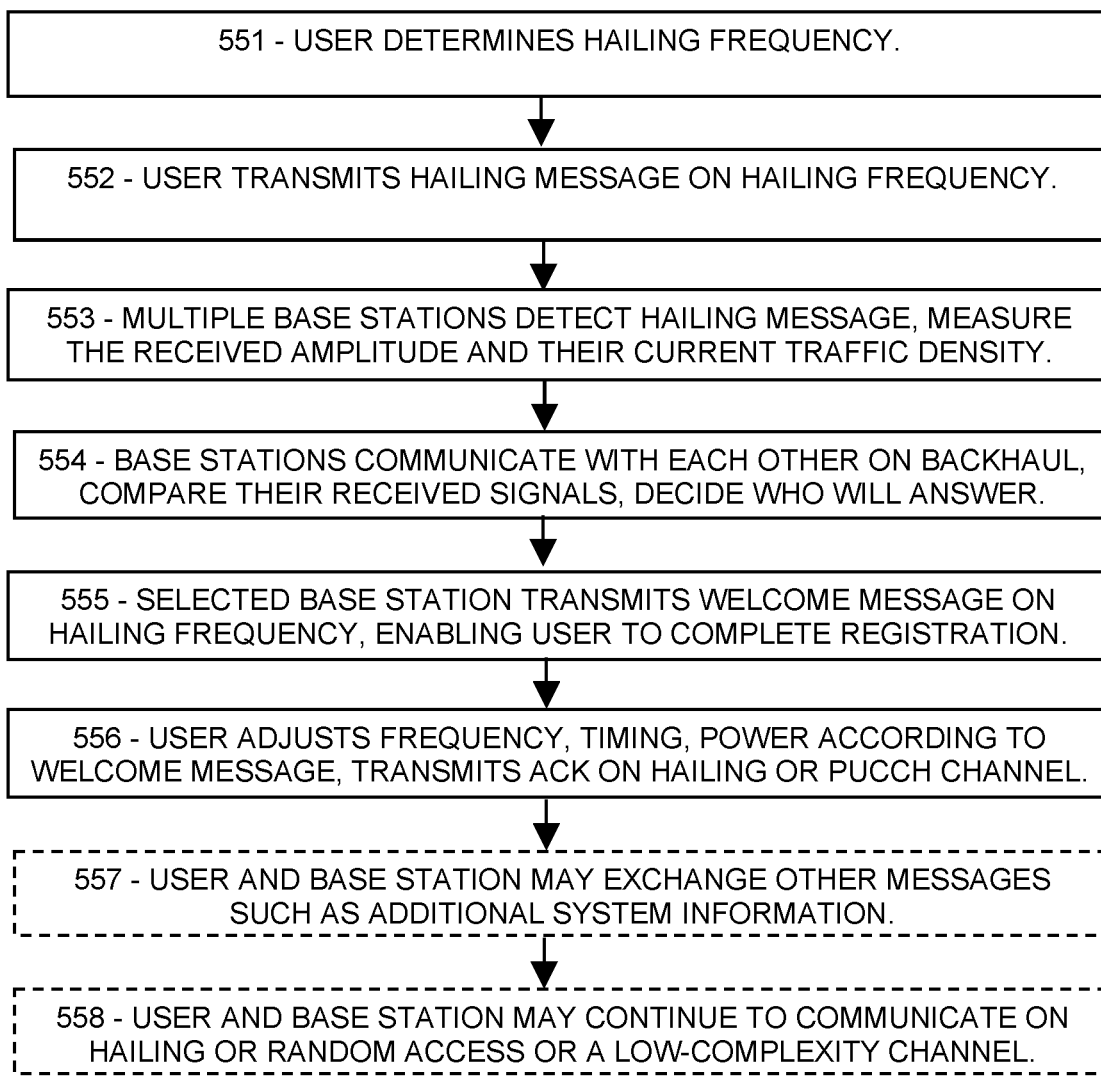
FIG. 5B is a flowchart showing an exemplary embodiment of a process for a base station to reply to a user device, according to some embodiments.

FIG. 5B is a flowchart showing an exemplary embodiment of a low-complexity procedure for a user device to communicate with an assigned base station, according to some embodiments. As depicted in this non-limiting example, at 551, the prospective user device determines a local hailing frequency from an on-line database, or a previously established convention, or information built-in or provided on a plug-in card, or otherwise. At 552, the user device transmits a hailing message on the hailing frequency, the hailing message indicating that the user device seeks contact with an available base station. At 553, the hailing message is received by multiple base stations, each of which measures its received signal amplitude. At 554, the base stations (or their connected core networks) compare the amplitude results of the various base stations by communication through a backhaul network, such as a wired or optical cable or other connection, or a wireless connection not interfering with the hailing frequency. The base stations may also indicate to each other how much traffic they are carrying, or how much unused capacity they have, or other measure of their availability to accommodate the new user. In addition, if the new user indicates, in its hailing message, that it needs special accommodation such as a low-complexity channel, or a legacy channel, or an especially high QoS or other performance, or other request, the base stations can consider that information in their mutual decision on which base station will respond. In a first embodiment, the base stations may determine which base station will reply to the hailing message by mutual agreement among the receiving base stations in cooperation. In a second embodiment, the determination may be made by a supervisor entity (not shown) such as a core network shared by the base stations, or other administrative entity configured to manage the individual base stations and to decide how to allocate new users among the base stations. At 555, the assigned base station transmits a welcome message, on the same hailing frequency in this example, thereby providing a redirect to the broadcast channel, or other data that the prospective user device needs to complete the registration. That data may include synchronization information regarding the network time-base including frame boundaries and the like, along with adjustment recommendations regarding the user device's frequency scale, timing, power level, and the like. For example, the base station may recommend time adjustments relative to the welcome message, to align the new user with slot boundaries. Alternatively, the timing adjustments may be relative to the user's hailing message instead of the welcome message, and hence may account for the two-way travel time of the signal. The base station may also provide a code identifying the network that the user device is joining, along with a temporary identification such as a C-RNTI for the user device, among other user-specific information. At 556, the user device adjusts its time, power, and frequency as suggested, and transmits an acknowledgement on the hailing frequency, or on one of the regular channels such as the random access channel or the uplink control channel of the base station, using its newly-assigned C-RNTI identification code, thereby completing the registration. Optionally, in dash, at 557 the user device and the base station may exchange further information regarding the capabilities and limitations and QoS requirements of the user device. Optionally, at 558, if the user device is a light user with only short and seldom messages, the user device may continue to communicate on the hailing frequency if permitted by the base station, or on another channel allocated by the base station for light users or those requiring low-complexity procedures.

An advantage of the base stations communicating with each other on backhaul may be that they can cooperatively determine which base station should reply to the hailing message. Another advantage may be that the decision as to which base station will respond, may be based on the amplitudes of the received signals at the various base stations, or on the calculated distances of the user device from the base stations, or on other criteria related to signal quality. Another advantage of the base station negotiations may be load-leveling, wherein the base stations may mutually decide (or an administrator may decide) to connect the user device with a particular base station that has low traffic instead of a closer base station which is under a heavy load. An advantage of the base stations communicating with each other (or with an administrator) may be that a suitable base station for the user device may be determined without the user device having to do a time-intensive blind search. An advantage of the assigned base station transmitting a welcome message on the same frequency as the hailing message, may be that the user device is already connected to the hailing channel and therefore may receive the welcome message readily without switching frequencies. Alternatively, a second frequency may be provided for the reply messages. An advantage of providing a separate channel for the reply messages may be to keep the hailing channel relatively free for other new entrants.

The systems and methods further include using artificial intelligence (AI) or machine learning (ML) in allocating traffic to various available base stations. As the number of base stations increases in urban areas and automated manufacturing sites, selection of which base station is to accept a new user is often a complex problem, with proximity, signal clarity, traffic level, capacity of each candidate base station, the new user's service requirements and expected messaging volume, and many other factors influencing the assignment decision. In such problems, artificial intelligence or machine learning may provide improved management and reduced computational expense. For example, AI can provide optimal, or at least improved, decision-making that accounts for all of the factors listed above and others, while optimizing or at least enhancing an overall network performance metric.

Typically an AI structure (such as a neural net) includes a large number of adjustable internal variables in functions configured to relate a plurality of input parameters to an output decision or prediction. The input parameters may include the distances from the user device to each of the available base stations, the traffic loads at each, and the other factors listed above, among other factors. Using a supercomputer, usually, the variables are iteratively adjusted until the AI structure reliably provides a desired output, such as accurate predictions regarding network performance according to the user allocation decision, or other solutions that result in an improvement of the performance metric. Alternatively, the output of the AI structure may include an indication of which base station should respond to the hailing message. In many multi-variable problems, an AI structure may be able to provide better solutions than a human expert, and in less time, especially in rapidly changing conditions in high-density wireless environments. By applying such an AI structure to the base station selection problem, and "training", or iteratively adjusting, the variables according to a large number of observed network situations and operational decisions, the AI model may reach an acceptable level of accuracy, and hence the algorithm may help base stations to make better decisions regarding the allocation of their resources, including accepting newly arriving user devices, and may do so faster or more accurately than a human expert could. In addition, the same or similar AI structure may enable improved decision-making for distributing the existing users among the available base stations, such as shifting users from one cell to another for load-leveling or to make room for a high-priority demand from a particular user, or other circumstance. As a result, network performance may be improved, the new user device may be served with better reception by an available base station, the other base stations may be shielded from overloading, and the overall user satisfaction may be improved.

Due to the potentially large number of inputs and adjustable variables in the model, and the very large amount of training data likely needed for convergence of the model, the AI structure is preferably prepared in a supercomputer. The supercomputer may be a classical semiconductor-based computer, with sufficient speed and thread count and processor count to perform the model training in a feasible amount of time. Alternatively, the supercomputer may be a quantum computer having "qbits" or quantum bits as its working elements. Quantum computers may provide special advantages to solving AI models because they can very rapidly explore a complex terrain of values, such as the highly interrelated effects of the various inputs on the output results. Therefore, the systems and methods include a quantum computer programmed to include an AI structure and trained on network data in which new or existing users may be allocated to the various base stations, and the subsequent network performance is then measured. By adjusting the variables in the AI model to accurately predict the network performance when the user allocation rules are changed, the AI model can then assist network administrators in placing new users with each of the base stations, and may also guide handoff decisions for load-levelling or improved reception, among many other compromises involved. For convenience, an algorithm may be derived from the AI model, either as a simplified version of the AI structure, or a different calculation tool such as a subroutine or a tabulation of values. The base stations or their core networks may then use the algorithm to allocate users among participating base stations to optimize network operations and provide better user satisfaction overall.

The systems and methods disclosed herein further include exemplary formats of messages associated with hailing and registration processes, according to some embodiments.

Figure 6A:
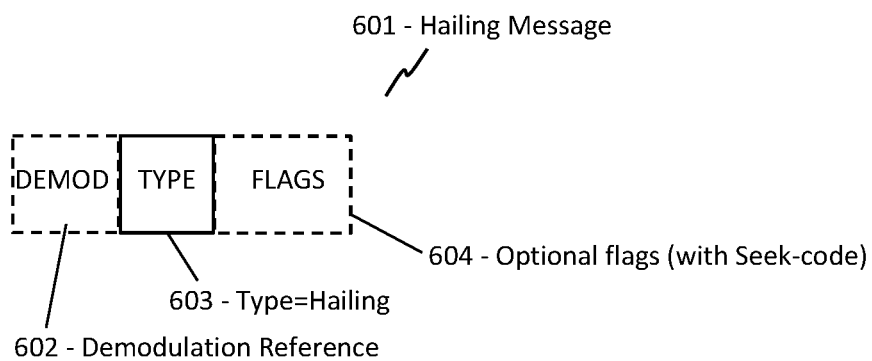
FIG. 6A is a schematic sketch showing an exemplary embodiment of a hailing message, according to some embodiments.

FIG. 6A is a schematic showing an exemplary embodiment of a low-complexity hailing message, according to some embodiments. As depicted in this non-limiting example, the hailing message 601 includes an optional demodulation reference 602 which may be short, a type-code 603 indicating that the message is a hailing message, and optionally a set of flags 604 such as some number of bits indicating something about the hailing device, such as indicating whether the hailing user already has the system information associated with the base station. In that case, the new user device may be ready to transmit a random access preamble as soon as a suitable base station is selected. Alternatively, the flags 604 may indicate that the communication is an emergency call and that the user therefore demands accelerated registration on the base station's cell. The flags 604 may include a "seek-code" which is a code indicating what type of entity the hailing user is seeking. As a non-limiting specific example, two bits of the flags 604 may be set to binary "00" if the hailing user wishes to connect with a base station (V2N), or "10" to seek another vehicle V2V), or "11" to seek any wireless entity (V2X), and the code "01" may be reserved for some future use. The flags 604 may also indicate that the user device is a reduced-capability device or requests a legacy protocol. The flags may alternatively indicate that the user device requests high QoS, or extremely low latency, or extremely high reliability communications, among other options. As mentioned, the example is non-limiting; artisans may devise other hailing messages with other fields and other sizes, without departing from the appended claims.

An advantage of providing a leading demodulation reference 602 may be that it enables the base stations to better interpret the rest of the message. The demodulation reference may be, for example, just two resource elements exhibiting the maximum and minimum amplitude levels, and the maximum and minimum phase levels of the modulation scheme, thereby enabling the base stations to calculate the intermediate levels by interpolation. The base station can then demodulate the subsequent message elements according to the amplitude and phase levels so determined. An advantage of providing the type-code 603, indicating that the message 601 is of type hailing, may be to implicitly request a response from any base station in range. An advantage of the optional flags 604 may be to indicate whether the hailing node is a reduced-capability device, or whether the hailing message is an emergency call, among other options. Another advantage may be that the hailing message 601 may be short. For example, the message 601 including just the message-type field 603 may be represented in six to ten bits, which can be transmitted in three to five QPSK message elements. Alternatively, if the demodulation reference 602 and flags 604 are included, six to twelve message elements may be sufficient, although many other formats are possible. An advantage of including a seek-code in the hailing message may be that wireless entities other than those being sought may disregard the message, while entities of the type being sought may reply.

The examples refer to a standard modulation scheme of separate amplitude and phase modulation multiplexed in each message element. Alternatively, the message may be modulated according to PAM or pulse-amplitude modulation, in which two signals are separately amplitude modulated and then combined with a 90-degree phase difference. For the purposes of the present disclosure, those and other modulation schemes involving amplitude and/or phase modulation are equivalent. It is immaterial which type of modulation scheme is employed, as long as the receiving entity knows how to demodulate and interpret the message.

Figure 6B:
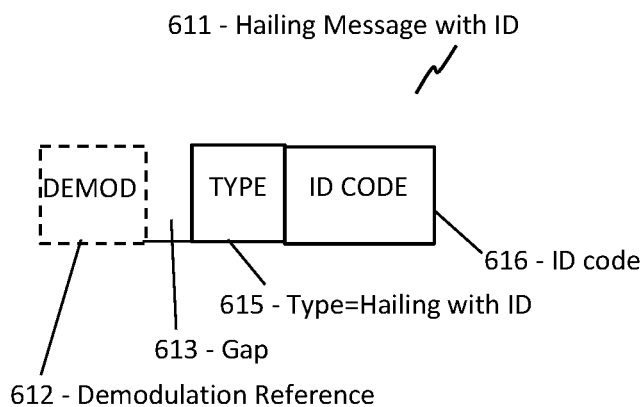
FIG. 6B is a schematic sketch showing an exemplary embodiment of a hailing message with pre-synchronization and identification code, according to some embodiments.

FIG. 6B is a schematic showing an exemplary embodiment of a low-complexity hailing message with identification, according to some embodiments. As depicted in this non-limiting example, a hailing message with ID 611 may include a type-code 615 indicating that the message is a hailing message with ID (identification), followed by the identification code 616 of the transmitting user device. The identification code 616 may be a self-selected or random code such as an 8-bit code, or it may be the user device's MAC address or a portion thereof, or other code suitable for identifying the hailing node in further messages. The identification code 616 may identify the transmitting user device so that the base stations may subsequently transmit messages specifically addressed (that is, unicast) to the hailing user device. Optionally, the message 611 may further include a demodulation reference 612, and optionally a space or gap 613 of zero transmission (or unmodulated carrier, or other signal not resembling the data) between the demodulation reference 612 and the type-code 615. The gap 613 may assist the receiving base stations in separating the demodulation reference 612 from the rest of the message, and may also give the base stations time to process the demodulation reference 612 and adjust the modulation calibration levels before receiving the remaining message elements.

For V2X applications, the example of FIG. 6B may be especially advantageous because it includes the ID code of the transmitting vehicle, so that the replying wireless entities can transmit their replies unicast to the hailing vehicle, thereby initiating communication between the hailing vehicle and the other wireless entity. In addition, the type-code 615 may include an indication of which entities are being sought by the message, such as one type-code for hailing messages seeking a network access, a second code seeking only a vehicle, and a third code seeking any entities within range, among many other possible types of recipients.

Figure 6C:
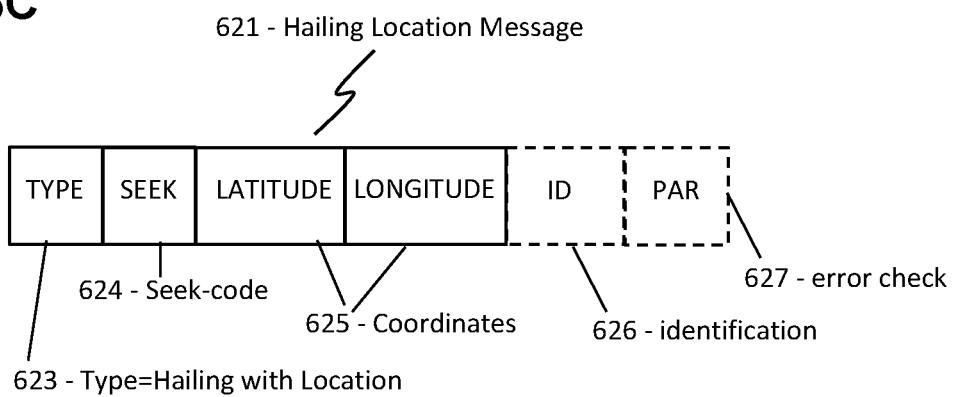
FIG. 6C is a schematic sketch showing an exemplary embodiment of a hailing location message, according to some embodiments.

FIG. 6C is a schematic showing an exemplary embodiment of a low-complexity hailing message with location data, according to some embodiments. As depicted in this non-limiting example, the hailing location message 621 includes a type-code 623 indicating the message is a hailing message with location data, a seek-code 624 indicating the kinds of entities being sought by the hailing entity, followed by the location coordinates of the hailing user device, such as the latitude and longitude 625 as shown, an optional identification code 626, and an optional CRC or parity or other error check code "PAR" 627. The identification code 626 may be a self-selected or random code such as an 8-bit code, or it may be the user device's MAC address or a portion thereof, or other code suitable for identifying the hailing node in further messages.

The coordinates 625 may be encoded for compactness. For example, each coordinate may be presented in degree fractions, that is, in degrees but with the whole-degree portion suppressed, so that only the fractional portion (to the right of the decimal point) is included in the message. It may not be necessary to specify the whole-degree portion because the range of the user-transmitted hailing message is unlikely to extend a full degree of latitude or longitude, which is about 100 km in most of the world. By specifying the fractional portion of each coordinate, each 14-bit value may provide a resolution of about 6 meters, which is generally comparable to GPS resolution. In other embodiments, the communicating entities are interested in recipients within a range of only a few hundred meters, such as vehicles in traffic. In that case, the coordinates 625 may be formatted as degrees, minutes, and seconds, but with only the seconds and fractional seconds included in the message (that is, whole degrees and minutes suppressed). Meter-scale resolution may be obtained with 10 or 11 bits. As mentioned, the example is non-limiting; artisans may devise other hailing messages with other fields and other sizes, without departing from the appended claims.

An advantage of including the user's location in a hailing message may be that the receiving base stations may thereby determine which base station is closest to the user device. An advantage of providing a type-code may be to inform the receiving entity that the message includes the user device's location or identification code or both. Another advantage may be that the hailing message is short. An advantage of providing the user device's self-selected identification code may be to enable the responding base station to transmit unicast to the user device, particularly to transmit its C-RNTI upon registration.

Figure 7A:
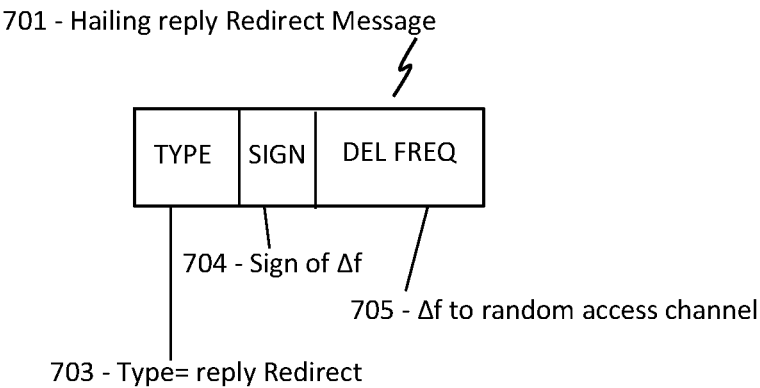
FIG. 7A is a schematic sketch showing an exemplary embodiment of a response redirect message, according to some embodiments.

FIG. 7A is a schematic showing an exemplary embodiment of a low-complexity hailing reply message with redirect, according to some embodiments. As depicted in this non-limiting example, the hailing reply redirect message 701 is transmitted by a base station in response to a hailing message, directing the user device to switch to a different frequency for further communication. The hailing reply redirect message 701, in this example, includes a type-code 703 indicating the message is a hailing reply with redirect, a sign bit 704 and a 7-bit frequency difference 705 indicating the base station's broadcast or random access channel relative to the hailing frequency. The frequency difference is given, in this example, as a multiple of 15 kHz. Hence the frequency redirect with 8 bits including sign may span 3840 kHz. In another embodiment, the frequency difference 705 may have 16 bits including sign, providing nearly 1 GHz span at 15 kHz resolution. Other encodings are possible for different ranges and different frequency resolution. For greater flexibility, the frequency may be specified as an absolute frequency instead of a frequency offset relative to the hailing frequency. If the frequency is specified as an offset, it may be offset from a standard value, such as 2 GHz, instead of the hailing or reply frequencies. As mentioned, the example is non-limiting; artisans may devise other hailing messages with other fields and other sizes, without departing from the appended claims.

As an option, the type-code 703 may be configured to act as a short demodulation reference as well as an indication that the message is a hailing response. For example, the first message element in the type-code 703 may modulated according to the maximum amplitude and maximum phase of the modulation scheme, and the second message element may be modulated according to the minimum amplitude and phase, followed by one or more message elements specifically indicating that the message is type hailing response. The user device can then recalibrate its demodulator levels according to the first and second message elements acting as demodulation reference elements, and thereby demodulate the remaining message more accurately.

An advantage of the hailing response redirect message may be that it may provide a frequency redirect to assist the user device, by pointing to another frequency, which may enable the hailing user device to proceed with a registration procedure. Another advantage may be that by redirecting the user device to another channel, the replying base station may thereby keep the hailing channel free for subsequent hailing messages. Another advantage may be saving time, since the user device may then carry out an access procedure without having to do a blind search. Another advantage may be that the message is short, in the depicted example.

Figure 7B:
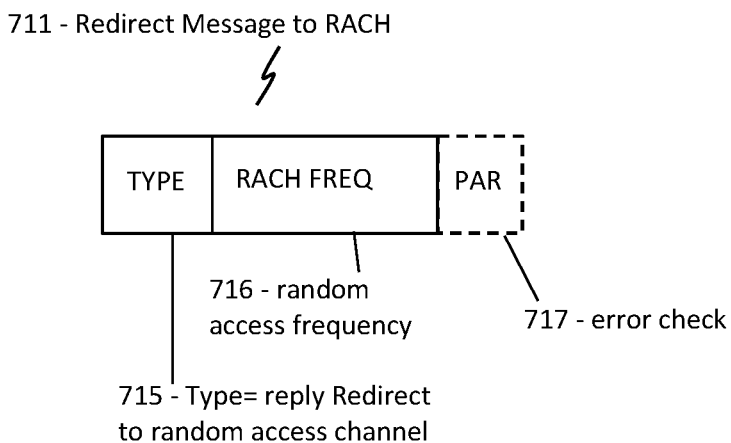
FIG. 7B is a schematic sketch showing an exemplary embodiment of a response redirect message to a random access channel, according to some embodiments.

FIG. 7B is a schematic showing an exemplary embodiment of a low-complexity hailing reply redirect message to the random access channel, according to some embodiments. As depicted in this non-limiting example, the reply message 711 is a base station's reply to a user device's hailing message. The depicted reply message 711 includes a type-code 715 indicating the type of message, and a frequency field 716 indicating the frequency of another channel, which in this case is the random access channel (or alternatively the broadcast channel or some other channel) of the base station, plus optionally an error code 717 such as a parity check or hash code of the message. The user device can then switch to the random access channel and either submit a preamble, if the user device already has the system information and is ready to join the network, or a low-complexity entry message requesting further low-complexity communications on the random access channel or other channel that the base station may indicate for such communications.

Figure 7C:
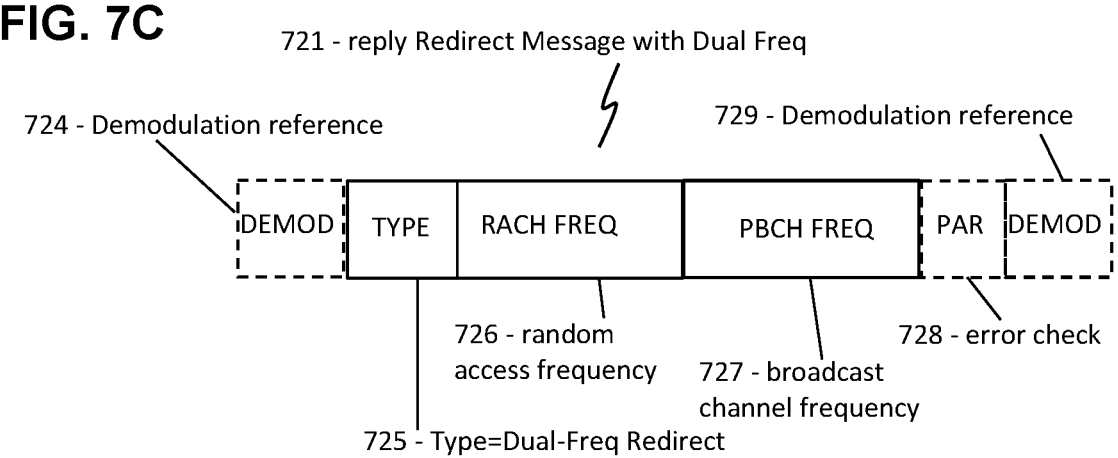
FIG. 7C is a schematic sketch showing an exemplary embodiment of a response redirect message with two frequency redirects, according to some embodiments.

FIG. 7C is a schematic showing another exemplary embodiment of a low-complexity hailing reply redirect message, this time with two frequencies indicated, according to some embodiments. As depicted in this non-limiting example, the hailing reply message 721 includes a a type-code 725 indicating that the message provides two frequency redirects, followed by a redirect to the random access channel 726 and a redirect to the broadcast channel 727 of the responding base station. Optionally, an error-check field 728 may be appended. The dual frequency redirect option allows the prospective user device to jump to the PBCH to get the SSB if the user does not yet have updated system information, and to jump to the random access frequency directly if the user already has the system information.

Optionally, the message 721 may include a leading demodulation reference 724 before the type-code 725, and a following demodulation reference 729 after the parity check field 728 (or elsewhere in the message). The receiving user device may use the two demodulation references 724-729 to mitigate noise and interference, and thereby enable a more accurate demodulation of the message 721. For example, the user device can measure the amplitude and phase levels of each element of the message 721 and store that data in a memory, for example, and then can demodulate the stored data according to the two demodulation references 724-729. For example, the user device can average the two demodulation references 724-729 to obtain an average value of the amplitude and phase levels during the message 721. Alternatively, the user device can prepare an interpolated or weighted average of the leading and following demodulation references 724-729, weighted according to the distance of each message element from each of the demodulation references 724-729. For example, the first element of the type-code 725 may be demodulated according to modulation levels derived by weighting the leading demodulation reference 724 much more heavily than the following demodulation reference 729, due to proximity of that message element to the leading demodulation reference 724. A centrally-positioned element of the message 721, such as the first message element of the second frequency field 727, may be demodulated according to modulation levels with equal weighting of the leading and following demodulation references 724-729. Likewise, the final message element of the parity check field 728 may be demodulated primarily by the following demodulation reference 729 because that demodulation reference is much closer than the leading demodulation reference 724. In this way, noise and interference that varies in time (or frequency) between the beginning and ending of the message 721 may be compensated more accurately than by uniformly averaging the two demodulation references, 724-729, and much more accurately than using a single demodulation reference for the entire message 721, according to some embodiments.

An advantage of providing a type-code may be to indicate the type of message so that the receiving user device can interpret each field properly. An advantage of providing a frequency redirect may be to indicate a frequency of another channel at which the user device can proceed with registration. An advantage of providing two frequency redirects may be to allow the user device to choose whether to acquire the system information messages SSB and SIB1, or to proceed directly to the random access channel, among many other options for the redirect destinations. An advantage of providing two demodulation references at opposite ends of the message (or elsewhere in the message) may be to enable a more accurate demodulation of the message element despite variable noise and interference.

5G has enormous potential for high-end user devices such as computers and mobile phones with advanced software and powerful processors. However, many future communication applications are expected to involve a completely different family of devices, with substantially lower cost, lower performance, and lower service demands than past wireless systems. It would be inefficient to establish a separate wireless technology adapted to low-end devices, but overlapping and competing with 5G/6G, especially since there is only one frequency spectrum which all wireless technologies must inescapably share. Low-demand devices could be upgraded to comply with 5G and future 6G standards at substantial extra cost, which would exclude or substantially attenuate many promising cost-constrained use cases. A much more efficient path forward would be to provide, in 5G and 6G, optional low-complexity procedures and a low-complexity channel or frequency, which can accommodate devices with far lower performance capabilities than current wireless devices. Low-complexity protocols, configured to enable reduced-capability user devices, may minimize demands on 5G and 6G base stations, and may be configured to avoid interfering with the higher-priority applications which may be communicating concurrently on the scheduled channels. It is possible to provide such low-complexity protocols and low-complexity channels without impacting, or at most minimally impacting, the scheduled network because reduced-capability devices generally do not require low latency, high reliability, large messages, wide bandwidth, or high usage. On the contrary, most of the emergent IoT applications involve infrequent, short messages transmitted locally by single-purpose sensors or actuators, placing very minimal demands on the network. By accessing the low-complexity options, such MTC devices may dedicate their attention primarily to serving their intended application, rather than spending their time and energy merely fulfilling complex 5G/6G requirements. Rapid proliferation of wireless applications will naturally result.

The systems and methods disclosed herein are intended to provide such non-interfering low-complexity options. It is important to incorporate the disclosed options and procedures early, while the 6G standards are still being developed. Experience with 4G demonstrates that trying to redesign an already fully established wireless technology to accommodate a different family of electronics is difficult. The options described herein include procedures for user devices to initiate contact with base stations using hailing messages and prototype low-complexity message formats for each of the above. When low-complexity procedures are incorporated in the 5G and 6G standards, these procedures will open opportunities for many low-demand applications involving low-cost wireless devices, applications that would not have been feasible absent the disclosed low-complexity procedures.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device to select a base station, the method comprising:
   a) determining a hailing frequency allocated for user devices to transmit hailing messages;
   b) transmitting, on the hailing frequency, a hailing message comprising a request for a base station to transmit a reply message on the hailing frequency;
   c) receive, during a predetermined interval, one or more reply messages, each reply message transmitted, at a calculated time, by a replying base station, responsive to the hailing message;
   d) for each reply message, determining a time delay between transmitting the hailing message and receiving the reply message;
   e) selecting, as a selected base station, one of the base stations according to the time delay; and
   f) transmitting an entry request message to the selected base station.

2. The method of claim 1, wherein the hailing message and the reply message are configured according to 5G or 6G technology.

3. The method of claim 1, wherein the hailing message comprises an indication that the hailing message is a hailing message.

4. The method of claim 1, wherein the hailing message comprises an identification code of the user device.

5. The method of claim 1, wherein the hailing message comprises an indication of a type of entity sought by the user device.

6. The method of claim 1, wherein the hailing message comprises a demodulation reference, followed by a gap of no transmission, followed by a latitude and a longitude of the user device.

7. The method of claim 1, wherein the calculated time is inversely related to an amplitude of the hailing message as received by the replying base station.

8. The method of claim 1, further comprising selecting, as the selected base station, the base station that transmitted the reply message that is received, by the user device, with a largest received amplitude.

9. The method of claim 1, further comprising selecting, as the selected base station, the base station that transmitted the reply message that is received, by the user device, with a smallest time delay.

10. The method of claim 1, wherein each reply message includes an indication of a location of the replying base station.

11. The method of claim 10, further comprising:
   a) calculating, for each replying base station, according to the location of the replying base station, a distance between the user device and the replying base station; and
   b) selecting, as the selected base station, the base station that is closest to the user device.

12. The method of claim 1, wherein:
a) the entry message comprises a request to continue communicating on a low-complexity channel; and
b) the low-complexity channel comprises the hailing frequency or a different frequency allocated for low-complexity communications.

13. The method of claim 1, further comprising determining, from a tabulation of base station data searchable according to location, the hailing frequency.

14. Non-transitory computer-readable media in a base station of a wireless network, the media containing instructions that when implemented in a computing environment cause a method to be performed, the method comprising:
a) determining a hailing frequency allocated for user devices to transmit hailing messages;
b) receiving, on the hailing frequency, a hailing message from a user device;
c) measuring an amplitude of the hailing message as received by the base station;
d) calculating, according to a formula based on the amplitude, a delay time;
e) while monitoring the hailing frequency, waiting the delay time;
f) upon expiration of the delay time, determining whether another base station is transmitting on the hailing frequency; and
g) upon determining that no other base station is transmitting on the hailing frequency, transmitting a reply message to the user device.

15. The non-transitory computer-readable media of claim 14, wherein the formula takes, as input, the measured amplitude and provides, as output, the delay time inversely related to the measured amplitude.

16. The non-transitory computer-readable media of claim 14, the method further comprising:
a) upon determining that one or more other base stations have finished transmitting on the hailing frequency, transmitting the reply message to the user device.

17. The non-transitory computer-readable media of claim 14, wherein the reply message comprises a frequency of a managed channel of the base station.

18. The non-transitory computer-readable media of claim 14, wherein the reply message comprises an indication that the replying base station is a base station.

19. The non-transitory computer-readable media of claim 14, wherein the reply message comprises information regarding access to the replying base station.

20. A processor comprising an AI (artificial intelligence) model, the processor configured to:
a) take, as input:
  i) a list of base stations receiving a hailing message from a user device;
  ii) a current occupancy of each base station in the list;
  iii) a maximum capacity of each base station in the list; and
  iv) an amplitude of the hailing message as received by each base station in the list;
b) and provide, as output, a selected base station that is to transmit a reply message to the user device.

* * * * *